United States Patent
Salapaka et al.

(10) Patent No.: US 7,360,405 B2
(45) Date of Patent: *Apr. 22, 2008

(54) METHOD TO TRANSIENTLY DETECT SAMPLE FEATURES USING CANTILEVERS

(75) Inventors: Murti V. Salapaka, Ames, IA (US); Abu Sebastian, Adliswil (CH); Deepak Ranjan Sahoo, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 28 days.

This patent is subject to a terminal disclaimer.

(21) Appl. No.: 11/421,352

(22) Filed: May 31, 2006

(65) Prior Publication Data

US 2006/0254346 A1    Nov. 16, 2006

Related U.S. Application Data

(63) Continuation-in-part of application No. 10/953,195, filed on Sep. 29, 2004, now Pat. No. 7,066,014.

(51) Int. Cl.
*G01B 5/28* (2006.01)
*G02B 6/26* (2006.01)

(52) U.S. Cl. ...................................... 73/105
(58) Field of Classification Search ............... 73/105
See application file for complete search history.

(56) References Cited

U.S. PATENT DOCUMENTS 6,845,190 B1   1/2005   Smithwick et al.
7,066,014 B2 *  6/2006  Salapaka et al. ............. 73/105
7,165,445 B2 *  1/2007  Bocek et al. .................. 73/105

FOREIGN PATENT DOCUMENTS

JP           11-007307 A   *  1/1999

OTHER PUBLICATIONS

JP11-007307-A, machine-assisted English language translation.*
Chen, G. Y. et al. "Resonance response of scanning force microscopy cantilevers" Rev. Sci. INstrum vol. 65, No. 8, Aug. 1994, pp. 2532-2537.*
Chon, James W. M. et al. "Experimental validation of theoretical models for the frequency response of atomic force microscope cantilever beams immersed in flids" J. Applied Phys. vol. 87, No. 8, Apr. 2000, pp. 3978-3988.*

(Continued)

*Primary Examiner*—Michael Cygan
(74) *Attorney, Agent, or Firm*—Reinhart Boerner Van Deuren P.C.

(57) ABSTRACT

An approach to determine cantilever movement is presented. An observer based state estimation and statistical signal detection and estimation techniques are applied to Atomic Force Microscopes. A first mode approximation model of the cantilever is considered and an observer is designed to estimate the dynamic states. The cantilever-sample interaction is modeled as an impulsive force applied to the cantilever in order to detect the presence of sample. A generalized likelihood ratio test is performed to obtain the decision rule and the maximum likelihood estimation of the unknown arrival time of the sample profile and unknown magnitude of it. The use of the transient data results in sample detection at least ten times faster than using the steady state characteristics.

19 Claims, 24 Drawing Sheets

OTHER PUBLICATIONS

Tringe, J. W. et al. "Model-based Processing of Microcantilever Sensor Arrays", May 17, 2005, UCRL-JRNL-212326, The institute of Electrical and Electronica Engineers Journal of Microelectromechanical Systems.*

Greg Welch and Gary Bishop; An Introduction to the Kalman Filter; Paper; Updated Mar. 11, 2002; 16 pgs.

Martin Stark, Robert W. Stark, Wolfgang M. Heckl and Reinhard Guckenberger; Inventing dynamic force microscopy: From signals to time-resolved interaction forces; Paper—PNAS, Jun. 25, 2002; pp. 8473-8478; vol. 99, No. 13.

Woo Chun Choi and Nam Woong Kim; Experimental study on active vibration control of a flexible cantilever using an artificial neural-network state predictor; Paper; 1996; pp. 751-758; IOP Publishing Ltd.

* cited by examiner

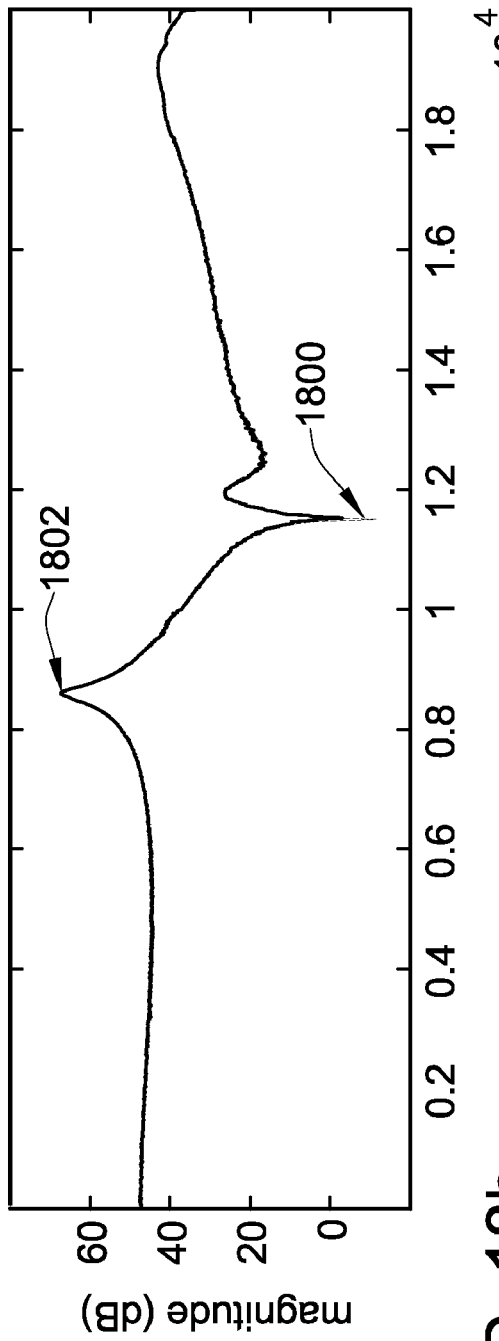
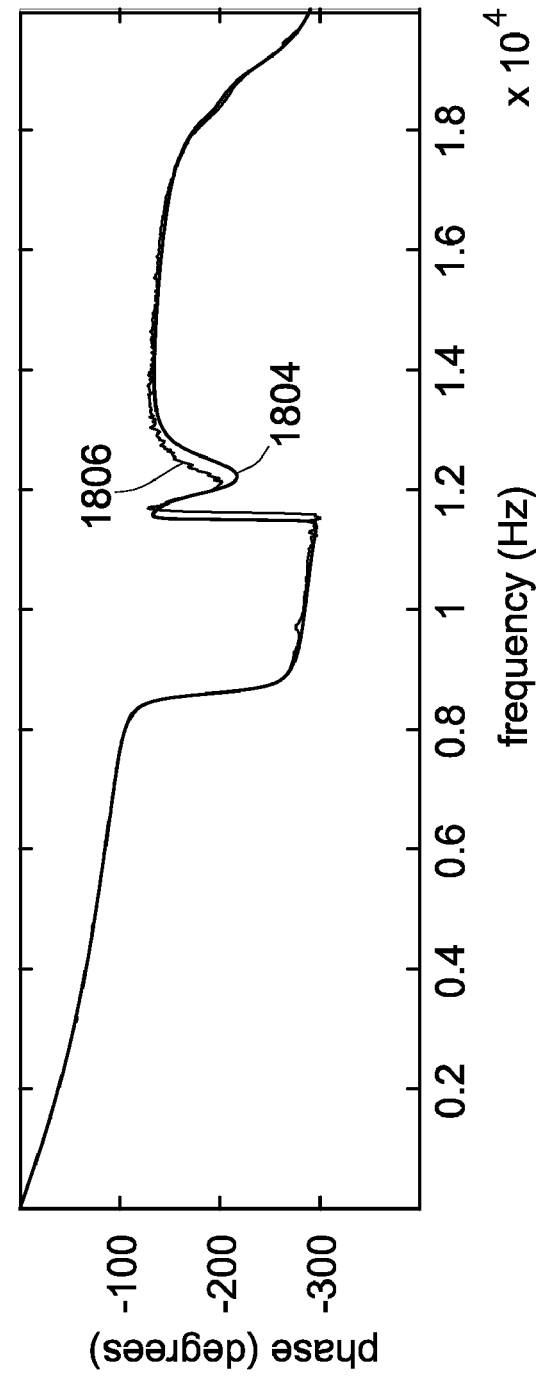

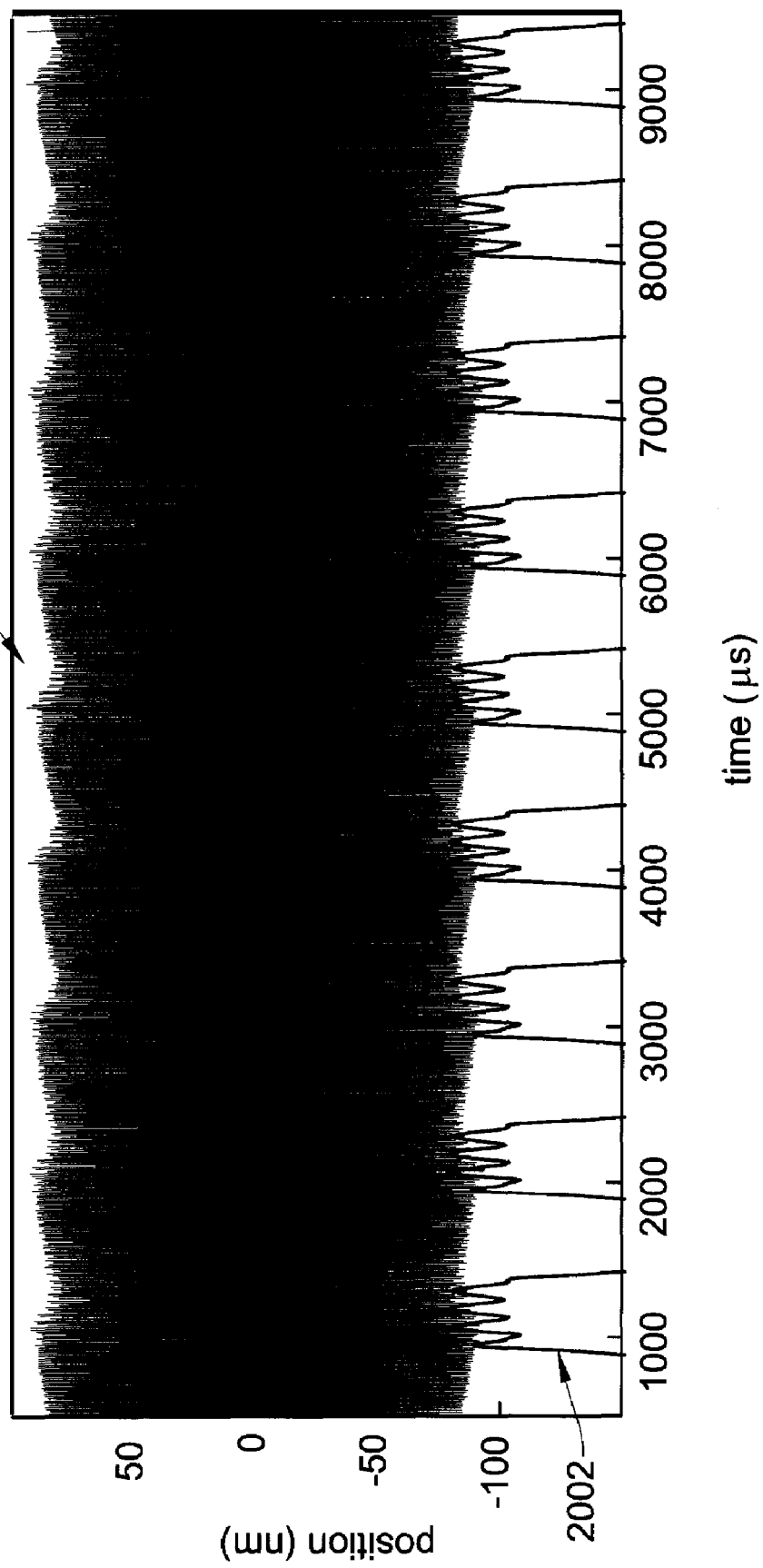

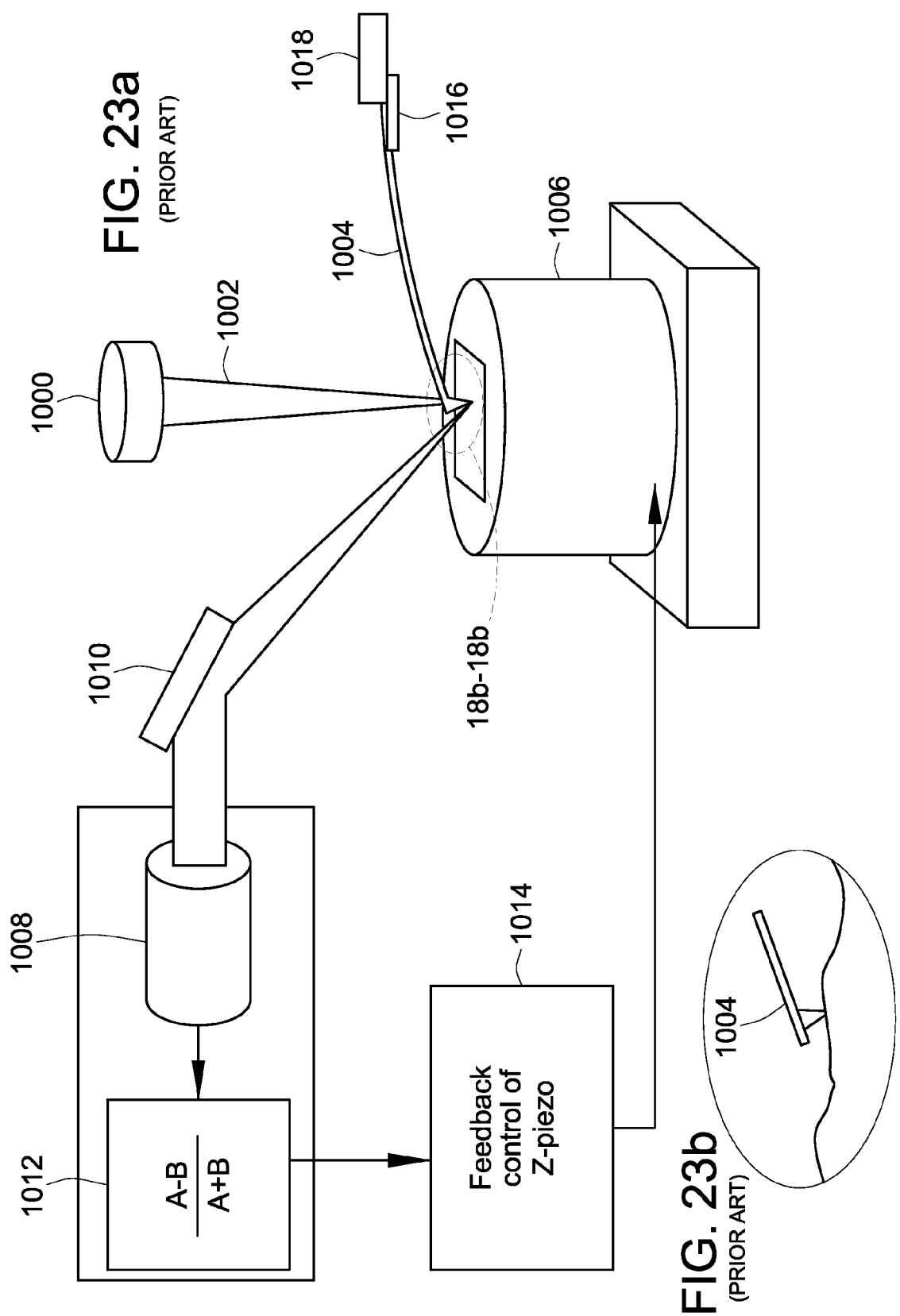

METHOD TO TRANSIENTLY DETECT SAMPLE FEATURES USING CANTILEVERS

CROSS-REFERENCE TO RELATED PATENT APPLICATIONS

This patent application is a continuation-in-part of U.S. patent application Ser. No. 10/953,195, filed Sep. 29, 2004, now U.S. Pat. No. 7,066,014 which claims the benefit of U.S. Provisional Patent Application No. 60/507,409, filed Sep. 30, 2003.

STATEMENT REGARDING FEDERALLY SPONSORED RESEARCH AND DEVELOPMENT

This invention was made in part with Government support under Grant Number 9733802 awarded by the National Science Foundation. The Government has certain rights in this invention.

FIELD OF THE INVENTION

This invention pertains to surface image measurements and more particularly relates to imaging/detection of sample features using cantilevers.

BACKGROUND OF THE INVENTION

Imaging and detection of sample features using cantilevers have been in use for decades. For example, one prevalent use of cantilevers is in Scanning Probe Microscopes (SPM's), which are instruments that have been in use in universities and industrial research laboratories since the early 1980's. These instruments allow for various imaging of surfaces as well as measurement of the intermolecular forces between two surfaces (or a small tip and a flat surface) in vapors or liquids with a distance resolution of 1 Å. This means that images and forces can be obtained at the atomic level. Over the years, the technique has been improved and its scope extended so that it is now capable of measuring many different surface properties and phenomena. One type of SPM is an atomic force microscope (AFM), which generally consists of a sample holder and a probe that is supported at the end of a force-measuring cantilever spring. The AFM measures a local property such as height, optical absorption, or magnetism, with a probe or "tip" placed very close to a sample. It operates by first positioning the tip near the surface and then moving the tip or surface vertically to maintain a constant deflection or amplitude of the cantilever in contact and tapping mode) respectively while measuring the force produced on the tip by the surface. The sample is moved in a lateral direction to perform a raster scan of the sample surface. The force is calculated by measuring the deflection of the cantilever spring supporting the tip.

The most common method of measuring deflection of the cantilever is the optical beam deflection method where vertical deflection can generally be measured with picometer resolution. The method works by reflecting a laser beam off end of the cantilever. Angular deflection of the cantilever causes a twofold larger angular deflection of the laser beam. The reflected beam strikes a split photodiode (i.e., two side-by-side photodiodes) and the difference between the two photodiode signals indicates the position of the laser beam on the split photodiode and thus the angular deflection of the cantilever.

FIGS. 23a and b illustrate a typical setup of a cantilever in an AFM application. The laser 1000 outputs a laser beam 1002 that is pointed at the cantilever 1004. A piezoelectric scanner 1006 is used to position the sample. The laser beam 1002 deflects off the cantilever 1004 and is reflected into the split photo-diode 1008 via mirror 1010. The output of the split photo-diode is conditioned via module 1012 and is input into feedback control module 1014 that is used to control the position of the sample movement of piezoelectric scanner 1006. In static force spectroscopy the cantilever deflection is solely due to the tip-sample interaction. The piezoelectric scanner 1006 is rastered in the lateral directions and the deflection of the tip is used to interpret sample properties. In the dynamic mode, the cantilever support 1016 is forced sinusoidally using a dither piezo 1018. The changes in the oscillations caused by the sample are interpreted to obtain its properties.

The cantilever has low stiffness and high resonant frequency that allows it to probe interatomic forces. Micro-cantilevers, which are cantilevers having lengths typically ranging from 100 to 200 µm with tips of 5 nm, have been utilized in biological sciences to perform feats such as cutting DNA strands and monitoring RNA activity. Another application of the micro-cantilever is in the detection of single electron spin that has significant ramifications for quantum computing technology.

In spite of the underlying promise, considerable challenges remain. Pivotal to harnessing the vast potential of micro-cantilever based technology is ultra-fast interrogation capabilities. This is apparent as the manipulation, interrogation and control of atoms or spins of electrons needs to be accomplished for material that has macroscopic dimensions. To achieve high throughput, fast interrogation is imperative. It is becoming increasingly evident that for many nanotechnological studies, high bandwidth is a necessity. For example, in the field of cell biology, proposals on using nanotechnology have been presented where nano-probes track events in the cell. These events often have time-scales in the micro-second or nano-second regimes. Current measurement techniques do not meet the aforementioned high precision and bandwidth requirements. For example, the micro-cantilever is often operated in the dynamic mode where it is forced sinusoidally by a dither-piezo. This mode of operation has advantages of better signal to noise ratio and being gentle on the sample. Most dynamic imaging methods employing micro-cantilevers currently use variables such as the amplitude and phase, or the equivalent frequency of the micro-cantilever to infer sample characteristics. These are steady state characteristics and do not hold much significance during the transient of the cantilever oscillation. The present methods are therefore inherently slow owing to the large settling times of the cantilever oscillations.

BRIEF SUMMARY OF THE INVENTION

The invention provides an ultra-fast method to obtain imaging data using transient data of a cantilever used in various applications such as an atomic force microscope (AFM), computing technologies, etc. The cantilever is modeled via an observer that is used to estimate the state of the model. Corresponding data during the transient state of the cantilever is analyzed using a likelihood ratio test to detect and probe the sample profile. The use of the transient data results in sample detection at least ten times faster than using the steady state characteristics. The time taken to detect the sample is proportional to the natural frequency of the cantilever and effectively decoupled from the quality factor of the cantilever.

These and other advantages of the invention, as well as additional inventive features, will become more apparent from the following detailed description when taken in conjunction with the accompanying drawings.

BRIEF DESCRIPTION OF THE DRAWINGS

FIGS. 18a and 18b are graphs illustrating the model response and the piezo response of an atomic force microscope in accordance with the invention;

FIGS. 20a and 20b are graphs illustrating the cantilever position and innovation process in response to a pulse shape generated using the piezo dynamics;

FIG. 23a is a block diagram of a prior art atomic force microscope; and

FIG. 23b is a diagram of the cantilever of FIG. 18a in contact with a sample.

DETAILED DESCRIPTION OF THE INVENTION

Figure 1:
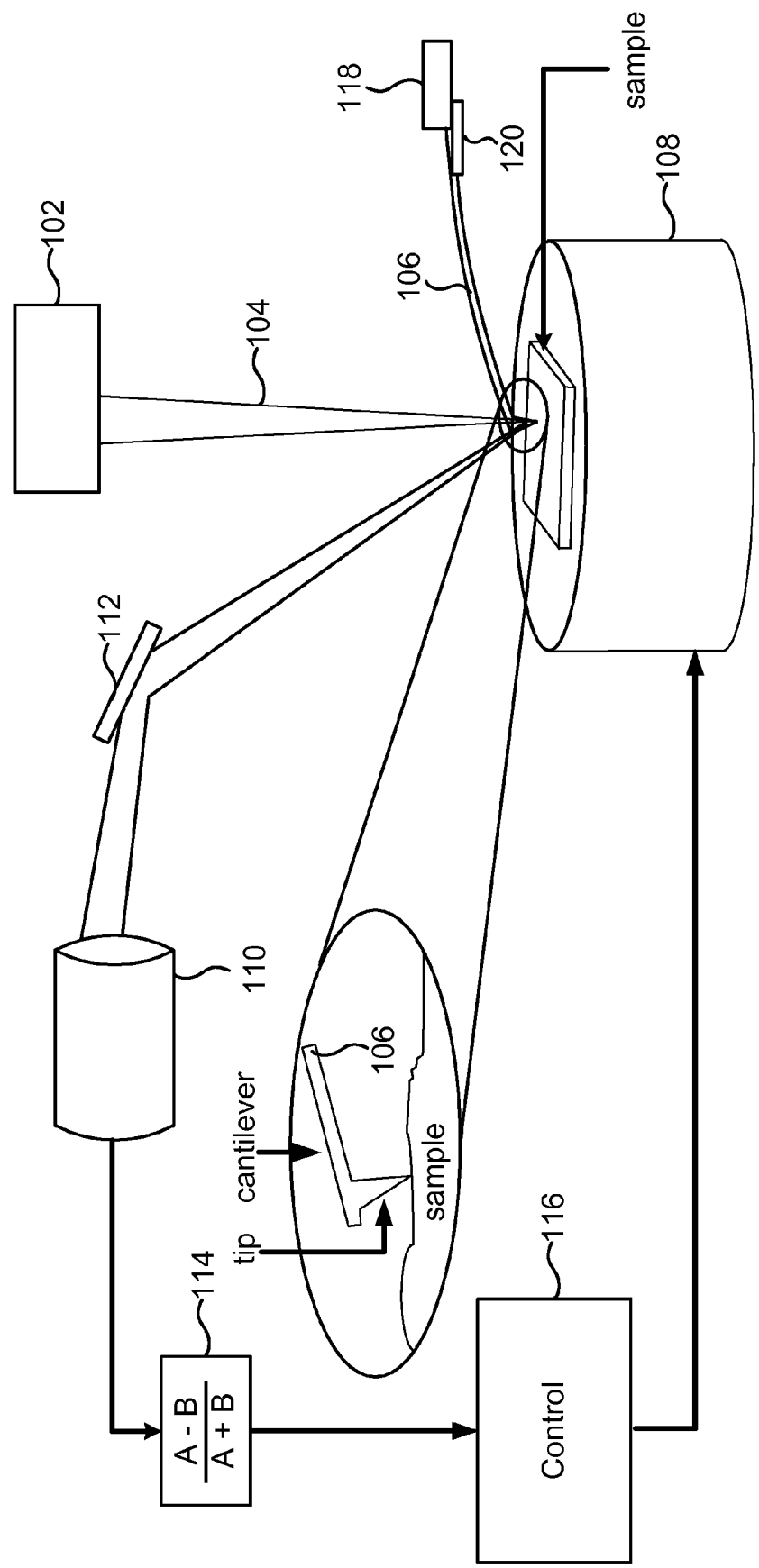
FIG. 1 is a block diagram generally illustrating an exemplary atomic force microscope environment on which the present invention may reside.

The invention provides a method to utilize the transient behavior of the cantilever oscillations for sample imaging and detection in sensing systems (i.e., systems that detect and/or image a sample). The transient based methods of the invention improve performance of interrogation speeds by approximately two orders of magnitude over steady state based methods. Fundamental limitations due to high quality factors are removed by estimating cantilever motion. A model of the cantilever is used to build an observer that is used to estimate the state of the cantilever dynamics. The cantilever-sample interaction is modeled and corresponding data during the transient state of the cantilever is analyzed using generalized likelihood ratio test to detect and probe the sample profile. The use of the transient data results in sample detection at least two orders faster than using the steady state data based methods.

Turning to the drawings, wherein like reference numerals refer to like elements, the invention is illustrated as being implemented in a suitable sensing environment 100. In the environment, a laser 102 outputs a laser beam 104 that is pointed at the cantilever 106. The laser beam 104 deflects off the cantilever 106 and is reflected into a split photo-diode 110 via mirror 112. The output of the split photo-diode is conditioned via module 114 and is input into a control module 116 that is used to control the position of the sample relative to the cantilever 106. In one embodiment, the relative position of the sample is controlled by a positioning device 108. Alternatively, the cantilever position may be controlled in relation to the sample. In the description that follows, an AFM shall be used to describe the invention. While an AFM shall be used, the invention may be used in other sensing applications where a cantilever is used to detect and/or scan a surface of a sample. For example, the techniques and methods described herein may be used in detecting features in systems, detecting structural problems in structures, detecting events such as when a sample is changing, etc.

In an AFM, a piezoelectric scanner is used to position the sample in one embodiment. The laser beam 104 deflects off the cantilever 106 and is reflected into a split photo-diode 110 via mirror 112. The output of the split photo-diode is conditioned via module 114 and is input into control module 116 that is used to control the position of the sample by movement of piezoelectric scanner 108. The piezoelectric scanner 108 is rastered in the lateral directions and the deflection of the cantilever is used to interpret sample properties. In the dynamic mode, the dither piezo 118 is used to force the cantilever support 120 to move sinusoidally. The changes in the oscillations caused by the sample are interpreted to obtain its properties.

Figure 2:
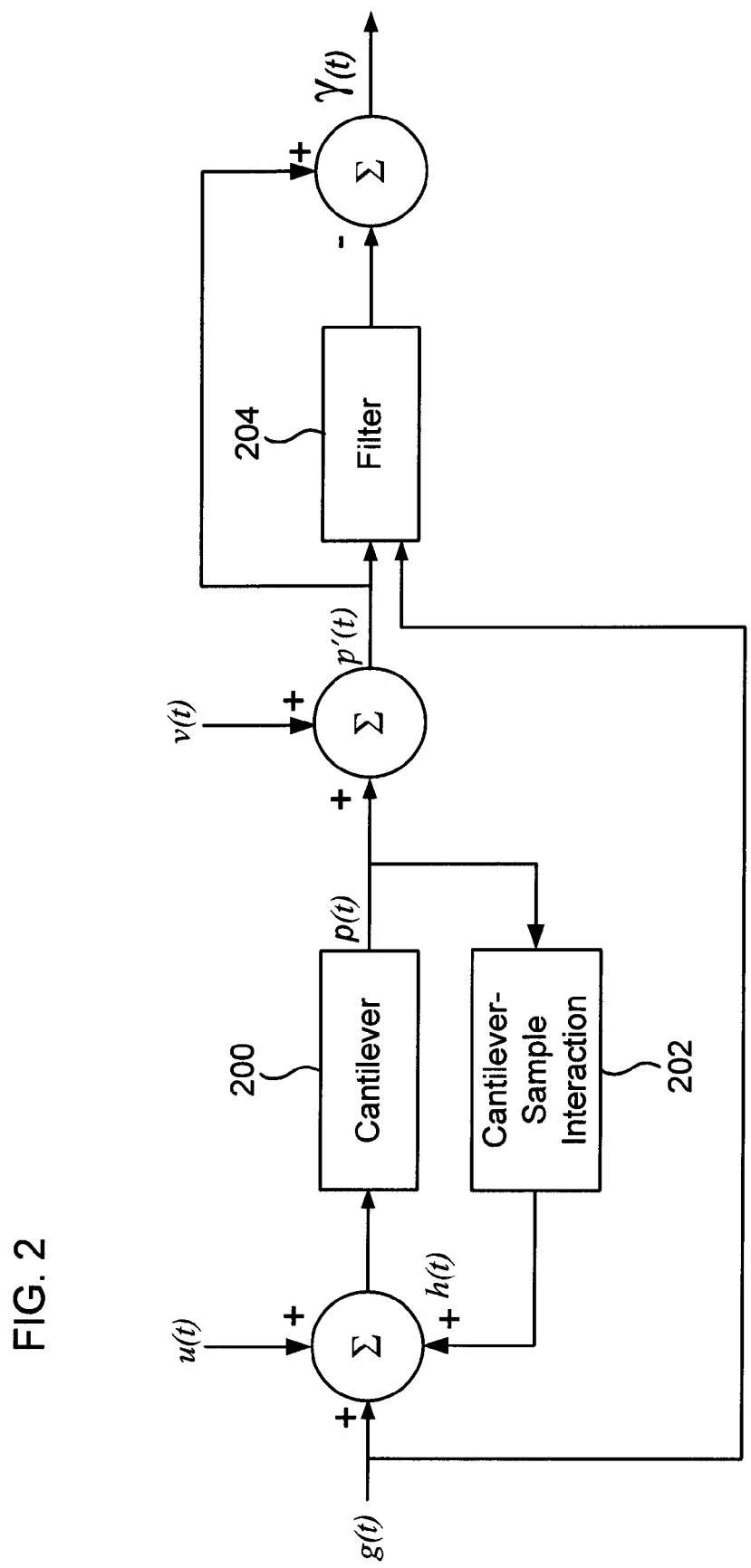
FIG. 2 is a block diagram generally illustrating the control blocks of the present invention.
Figure 3:
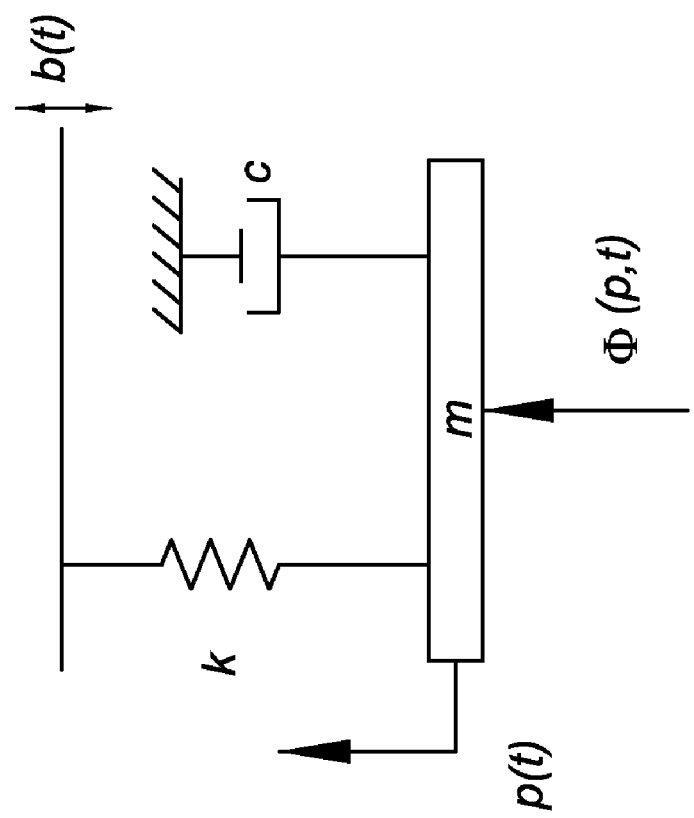
FIG. 3 is a block diagram of a spring-damper-mass model of cantilever dynamics.

Turning now to FIG. 2, a block diagram of the system model that the control module 116 implements is shown. The cantilever module 200 is the model of the cantilever. The cantilever module 200 has inputs g(t) and u(t) where g(t) is the external forcing on the cantilever and u(t) is the thermal noise. The model of the cantilever when it is forced sinusoidally at its first resonant is accurately described by $$\ddot{p} + 2\xi\omega_0\dot{p} + \omega_0^2 p = g(t) + u(t) \quad (1)$$

where p(t), g(t), u(t) $\omega_0$ and $\xi$ denote the micro-cantilever deflection as measured by the photo-diode 110, the external forcing on the cantilever, forcing due to thermal noise, the first resonant frequency of the cantilever and the damping factor in free medium respectively. This model can be viewed as a spring mass damper system as illustrated in FIG. 3. Turning briefly to FIG. 3, the spring-damper-mass model depicts the cantilever dynamics oscillating freely ($\Phi$=0) at its resonance frequency as described by Equation (1) with $$\omega_0 = \sqrt{\frac{k}{m}},\ 2\xi\omega_0 = \frac{c}{m}, \quad (2)$$

and $$g(t) = \frac{k}{m}b(t)$$

where k is the spring constant, c is the damping constant, m is the mass, and b(t) is the sinusoidal forcing due to the dither piezo.

Note that $$\xi = \frac{1}{2Q}$$

with Q being the quality factor of the micro-cantilever. The parameters of the cantilever model can be accurately obtained by thermal noise analysis. From Equation 1, the continuous time state-space model of the micro-cantilever dynamics can be described as, $$\begin{pmatrix} \dot{x}_1 \\ \dot{x}_2 \end{pmatrix} = \begin{pmatrix} 0 & 1 \\ -\omega_0^2 & -2\xi\omega_0 \end{pmatrix}\begin{pmatrix} x_1 \\ x_2 \end{pmatrix} + \begin{pmatrix} 0 \\ 1 \end{pmatrix}(u+f_s) \quad (3)$$

$$y = (1\ 0)\begin{pmatrix} x_1 \\ x_2 \end{pmatrix} + \upsilon$$

where state $x_1$ denotes the cantilever position p(t), state $x_2$ denotes the cantilever velocity $\dot{p}(t)$, and $\upsilon$ denotes the noise affecting the photodiode sensor. u=$n_{th}$+g(t) represents the combined effect of the thermal noise $n_{th}$, and the sinusoidal forcing b(t) due the dither piezo. The function $f_s$, which in terms of FIG. 3 is $$f_s = \frac{k}{m}\Phi,$$

represents the equivalent force on the cantilever due to cantilever-sample interaction. The discretized version of the above model when the sample is not present can be denoted by $$x_{i+1} = Fx_i + Gu_i \quad (4)$$
$$y_i = Hx_i + \upsilon_i,\ i \geq 0$$

where $$E\left\{\begin{bmatrix} u_i \\ \upsilon_i \\ x_i \end{bmatrix}\begin{bmatrix} u_j \\ \upsilon_j \\ x_0 \\ 1 \end{bmatrix}^T\right\} = \begin{bmatrix} Q_i\delta_{ij} & 0 & 0 & 0 \\ 0 & R_i\delta_{ij} & 0 & 0 \\ 0 & 0 & \Pi_0 & 0 \end{bmatrix} \quad (5)$$

It is assumed that the input noise and the noise in the output are uncorrelated. Note that when the sample is not present, the cantilever settles into a sinusoidal trajectory buried in noise.

Figure 4:
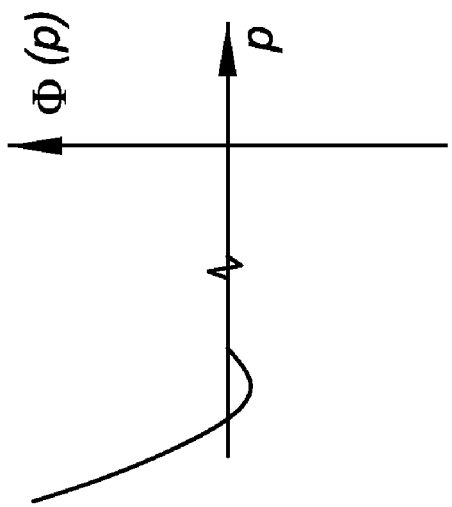
FIG. 4 is a plot illustrating the effect of cantilever-sample interaction on the cantilever.

When a sample is present, there is an attractive or repulsive force on the cantilever depending on the regime of interaction. Typically this cantilever-sample interaction is characterized by short range repulsive forces and long range attractive forces as shown in FIG. 4.

In many applications when the sample is introduced after the cantilever has settled into a sinusoidal orbit, the effect of the cantilever-sample interaction force of block 202 is modeled as an impulsive force. Intuitively this also follows because the time spent by the cantilever under the sample's influence is negligible compared to the time it spends outside the sample's influence. This assumption is particularly true for samples that have a small attractive regimes. Under such an assumption the cantilever dynamics is described by $$x_{i+1} = Fx_i + Gu_i + \delta_{\theta,i+1}\nu$$
$$y_i = Hx_i + \upsilon_i, i \geq 0 \quad (6)$$

where $\theta$ denotes the time instant when the impact occurs, $\delta_{i,j}$ denotes the dirac delta function, and $\nu$ signifies the magnitude of the impact. Essentially, the impact causes an instantaneous change in the state by $\nu$ at time instant $\theta$. In this setting, the time of impact and the resulting change in the state are unknown quantities. The present invention determines when the cantilever is "hitting" the sample and when it is not, that is to detect whether the change in state is occurring or not.

In order to detect whether the change in state is occurring, an observer based state estimation techniques and related tools are used. Note that in an AFM setup, the position of the cantilever (deflection signal from the photo-diode sensors) is measurable, not the velocity. Returning to FIG. 2, cantilever 200 is the linear time invariant system depicting the model of the cantilever. The interaction with the sample is modeled and shown as a non-linear cantilever-sample interaction system 202 appearing in the feedback path. An observer 204 is designed based on the thermal noise and measurement noise characteristics and experimentally determined values of the parameters of the model as given in equation 3.

The filter 204 estimates the state of the cantilever by observing the known input signal (e.g., sinusoidal forcing from the dither piezo) and available output signal (e.g., cantilever deflection data from photo diode sensor). When the sample is present as given by the model in equation 6, the estimated and filtered states from the filter 204 are given by, $$\hat{x}_{i+1|i} = F\hat{x}_{i|i},$$

$$\hat{x}_{i|i} = \hat{x}_{i|i-1} + K_i\gamma_i \quad (7)$$

with the measurement residual $\gamma_i$, filter gain $K_i$ and error covariance matrices given by $\gamma_i = y_i - H\hat{x}_{i|i-1}$, $K_i = P_{i|i-1}H^T V_i^{-1}$, $P_{i+1|i} = FP_{i|i}F^T + GQG^T$, $P_{i|i} = P_{i|i-1} - K_i HP_{i|i-1}$, $V_i = HP_{i|i-1}H^T + R$ . . . In the steady state the gain and the error covariance matrices become constant matrices as $K = \lim_{i\to\infty} K_i$, $P = \lim_{i\to\infty} P_{i|i-1}$ and $V = \lim_{i\to\infty} V_i = HPH^T + R$. For convenience of implementation, steady state filter parameters are used.

The measurement residual $\gamma_i$ is given by, $$\gamma_i = Y_{i;\theta}v + \gamma_i^1 \quad (8)$$

where $Y_{i;\theta}$ is a known dynamic signal profile with unknown magnitude $v$ defined by the following recursive formulae, $$Y_{i;\theta} = H[\Phi(i,\theta) - FX(i-1;\theta)],$$

$$X(i;\theta) = K_i Y_{i;\theta} + FX(i-1;\theta), \quad (9)$$

with $\Phi(i,\theta) = \Pi^i_{j=\theta}F$ and $X(i;i) = K_i H$. Here $Y_{i;\theta}$ and $X(i;\theta)$ are the additive parts in the innovation and the state estimate respectively. It can be shown that $\{\gamma_i^1\}$ is a zero mean white noise sequence with covariance $V_i$ and is the measurement residual had the jump not occurred.

Note that the damping present in a typical cantilever is very low with a quality factor as high as 100 or above. This results in the cantilever taking considerable time to settle to the steady state periodic orbit. Whenever there is an impulsive input to the cantilever (possibly due to interaction with sample), the state changes to a new value. Since this input is not applied to the observer 204, the estimated state does not change instantly. This change is fed to the observer 204 through the output data. The observer takes noticeable time to correct the estimates and track the output again. This gives rise to transients in the estimation error. Note that the observer is capable of tracking the transient response of the cantilever much before the system settles to the steady state periodic orbit by appropriately choosing the gain $K_i$. However, at the starting of the transients, there is a mismatch between the actual output and the estimated output. This results in the dynamic profile $Y_{i;\theta}$. This observation motivated us to develop a faster detection technique. Present detection schemes use the steady state deflection data, whereas the approach described herein uses the residual in innovation to probe the sample.

We pose the detection problem in the hypothesis testing framework as following.

$$H_0: Y_i = \gamma_i^1, \quad i=1,2,\ldots,n$$

versus $$H_1: Y_i = Y_{i;\theta}v + \gamma_i^1, \quad i=1,2,\ldots,n \quad (10)$$

where $\gamma_i^1$ is a zero mean white gaussian process $$p(\gamma_i^1) = \frac{1}{(2\pi)^{\frac{n}{2}}(|V_i|)^{\frac{n}{2}}} \exp\left(-\frac{1}{2}\gamma_i^{1T}V_i^{-1}\gamma_i^1\right)$$

and $Y_{i;\theta}$ is a known dynamic profile with unknown arrival time $\theta$ and unknown magnitude $v$ as given in equation 8. The estimation problem is to compute the maximum likelihood estimate (MLE's) $\hat{\theta}(n)$ and $\hat{v}(n)$ based on the residual $\gamma_1, \ldots, \gamma_n$. In one embodiment, Willsky's generalized likelihood ratio test is used to solve both the detection and estimation problem. Willsky's generalize ratio test is described in the publications "A Generalized Likelihood Ratio Approach To Estimation In Linear Systems Subject To Abrupt Changes", Alan S. Willsky and Harold L. Jones, *Proc. IEEE Decision and Control*, pp. 108-112, November 1974 and "A Generalized Likelihood Ratio Approach To The Detection And Estimation Of Jumps In Linear Systems", Alan S. Willsky and Harold L. Jones, *IEEE Transactions on Automatic Control*, February 1976, which are hereby incorporated by reference.

The likelihood ratio when the jump occurs at time instant $\theta = \tilde{\theta}$ of magnitude $v = \tilde{v}$ is given by $$\Lambda_n(\tilde{\theta}, \tilde{v}) = \frac{p(\gamma_1, \ldots, \gamma_n | H_1, \theta = \tilde{\theta}, v = \tilde{v})}{P(\gamma_1, \ldots, \gamma_n | H_0)}.$$

The generalized likelihood ratio computes the likelihood ratio $$\Lambda_n = \frac{p(\gamma_1, \ldots, \gamma_n | H_1, \theta = \hat{\theta}, v = \hat{v})}{P(\gamma_1, \ldots, \gamma_n | H_0)},$$

where $\hat{\theta}$ and $\hat{v}$ are the maximum likelihood estimates of $\theta$ and $v$ under the hypothesis $H_1$ (i.e. $(\hat{\theta},\hat{v}) = \arg\max_{(\tilde{\theta},\tilde{v})}\Lambda_n(\tilde{\theta}, \tilde{v})$).

The decision function $g_n$ defined as the double maximization of $\Lambda_n$ over the parameters $\theta$ and $v$ is given by, $g_n = \max_{1\leq\theta\leq n} d^T(n;\theta)C^{-1}(n;\theta)d(n;\theta)$ where $$C(n;\theta) = \sum_{i=\theta}^{n} Y_{i;\theta}^T V^{-1} Y_{i;\theta}$$

and $$d(n;\theta) = \sum_{i=\theta}^{n} Y_{i;\theta}^T V^{-1} Y_i.$$

The likelihood ratio is defined as $l(n;\theta) = d^T(i;\theta)C^{-1}(n;\theta)d(n;\theta)$. The maximum likelihood ratio estimate (MLE) of $\theta$ is given by the value $\theta \leq n$ such that $\hat{\theta}_n = \arg\max_{1\leq\theta\leq n} l(n;\theta)$. The decision rule is $$g_n = l(n;\hat{\theta}_n) \overset{H_1}{\underset{H_0}{\gtrless}} \varepsilon, \quad (11)$$

where the threshold $\epsilon$ is chosen to provide a suitable trade off between false alarm and missed alarms. The MLE of $v$ is given by $\hat{v}_n(\theta) = C^{-1}(n;\theta)d(n;\theta)$. This method requires that the search for $\theta_n$ be on the entire data set between 1 and n, which requires a bank of filters with increasing length. In practice, the search may be carried out on a data window of finite length M. Note that the length M also affects the missed probability. The false alarm and detection probabilities are calculated as, $$P_F = P_0(\Gamma_1)$$
$$= \int_\varepsilon^\infty p(l = L|H_0)dL \text{ and } P_D(v, \theta)$$
$$= P_1(\Gamma_1)$$
$$= \int_\varepsilon^\infty p(l = L|H_1, v, \theta)dL$$

respectively. Since $$p(l = L|H_0) = -\frac{1}{2}\sum_{i=1}^{n} Y_i^T V^{-1} Y_i$$

under hypothesis $H_0$ and $Y_i$ are independent identically distributed gaussian random variables, $p(l=L|H_0)$ is Chi-squared ($\chi^2$) density with n degrees of freedom. Similarly $$p(l = L | H_1) = -\frac{1}{2}\sum_{i=1}^{n} Y_i^T V^{-1} Y_i - \frac{1}{2}v_n(\theta)\sum_{i=\theta}^{n} Y_{i;\theta}^T V^{-1} Y_i$$

is a non-central $\chi^2$ density with noncentrality parameter $v^T C(n;\theta)v$. This shows that $P_D$ is dependent upon values of $\theta$ and $v$.

For specified $P_F$ or $P_D$, the threshold value $\epsilon$ can be computed from the tables in "Handbook of Statistical Tables", D. B. Owen, *Addison Wesley, Reading*. Mass., 1922. Given $\epsilon$, the values $P_F$ or $P_D(v,\theta)$ can be computed similarly. In one embodiment, $v$ is used as the minimum jump that is required to be detected and $\theta$ as the size of the data window M to compute $P_D$.

Once a jump has been detected by a GLR detector, the MLEs $\hat{\theta}$ and $\hat{v}$ can be used to update the state estimate as $\hat{x}_{i|i,new} = \hat{x}_{i|i,old} + \{\Phi(i,\hat{\theta} - F[i;\hat{\theta}]\}\hat{v}$ and the covariance as $P_{i|i,new} = P_{i|i,old} + \{\Phi(i,\hat{\theta} - F[i;\hat{\theta}]\}C^{-1}[i,\hat{\theta}]\{\Phi(i,\hat{\theta}) - F[i;\hat{\theta}]\}$. This adaptive filtering scheme can be used to detect successive jumps. The size of the data window has to be chosen carefully to ensure the stability of the scheme.

Figure 6:
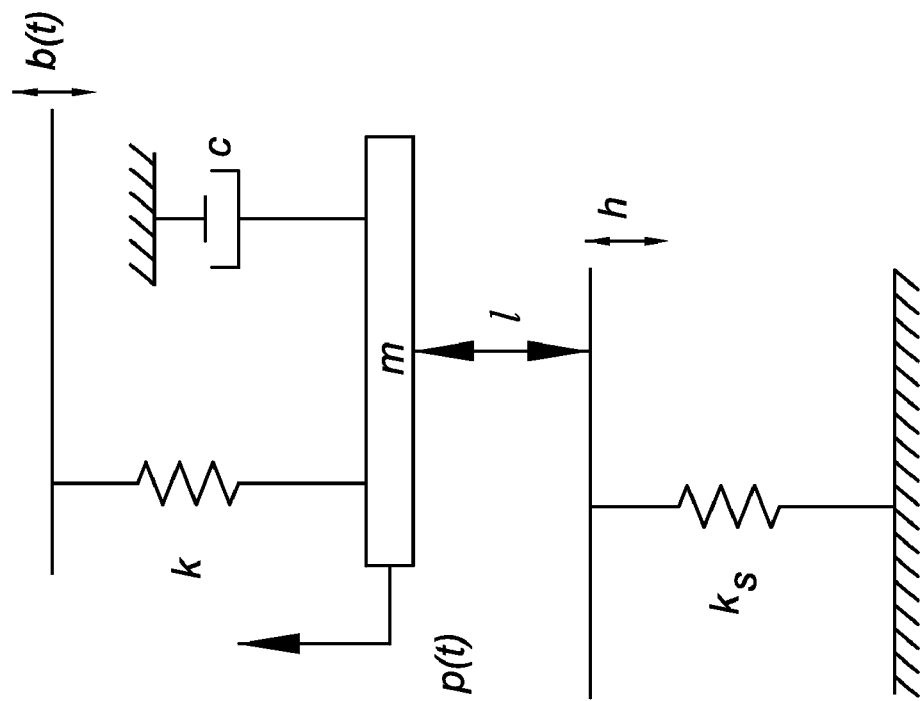
FIG. 6 is a block diagram of a cantilever-sample interaction model in accordance with the teachings of the present invention.
Figure 5:
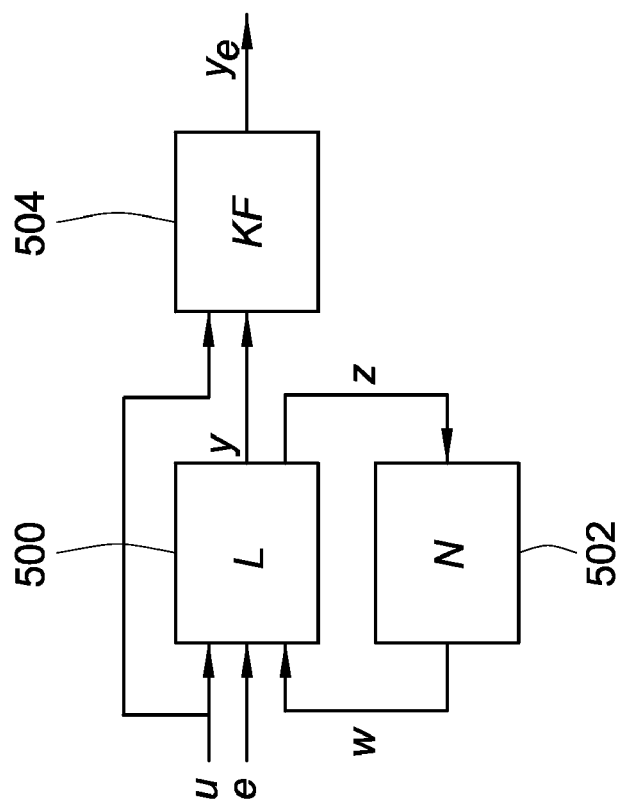
FIG. 5 is a block diagram of the observer based detection method in accordance with the teachings of the present invention.

Turning now to FIG. 5 the method of the present invention was simulated using Simulink in Matlab. The linear cantilever model 500 is given by equation 3, with natural frequency $f_0$=73,881 Hz, quality factor Q=130 and a sinusoidal forcing b(t) resulting in a free oscillation amplitude of $p_{max}$=24 nm. From testing, the mean deflection of the cantilever is 0.3 nm due to thermal noise during normal test conditions, which corresponds to input noise power to the model of Q=0.001 nmHz². The resolution of the photo-diode sensor in the set up is 1 Å, which corresponds to output noise power R=0.1 nm. The discrete time observer 504 is designed using Matlab functions. For simplicity in the simulation, a purely repulsive cantilever-sample interaction model 502 as given in FIG. 6 is used. The cantilever interacts with the sample only when p(t)>1. The force from the sample is then given by $f_s(t)$=4 h(t) pN. For simulation purposes, ks=4 pN/nm was chosen. This model corresponds to a static nonlinear block having a dead zone region of length 1. It is noted that a model that includes only the repulsive part of the cantilever-sample interaction is appropriate for many samples where the attractive regime is small.

Note that the observer based state estimation is sensitive to plant model uncertainties and experimental conditions that depend on thermal noise and sensor noise characteristics. In the simulations, the filter 504 is designed based on the actual model 204 and noise characteristics while the perturbed models of the cantilever and noise characteristics are employed as the real system.

Figure 7:
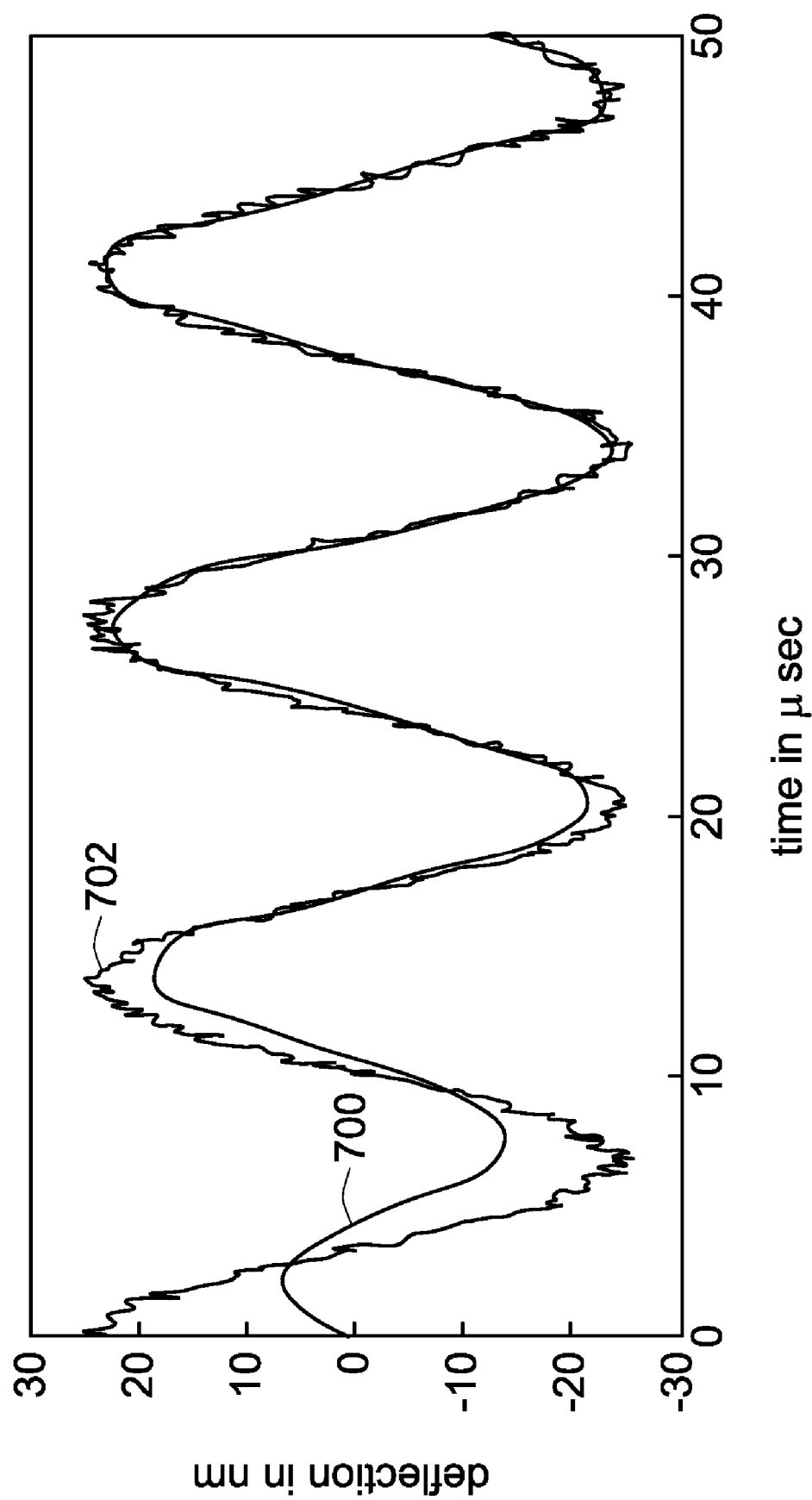
FIG. 7 is diagram illustrating the tracking of the observer of FIG. 5 with respect to the cantilever deflection signal.

Turning now to FIG. 7, the estimated deflection (curve 700) of the cantilever from the filter 504 is plotted with the actual deflection (curve 702). The initial estimation error seen in the first ten seconds is due to the mismatch in the initial state of the cantilever model 500 and the filter 504.

Figure 8:
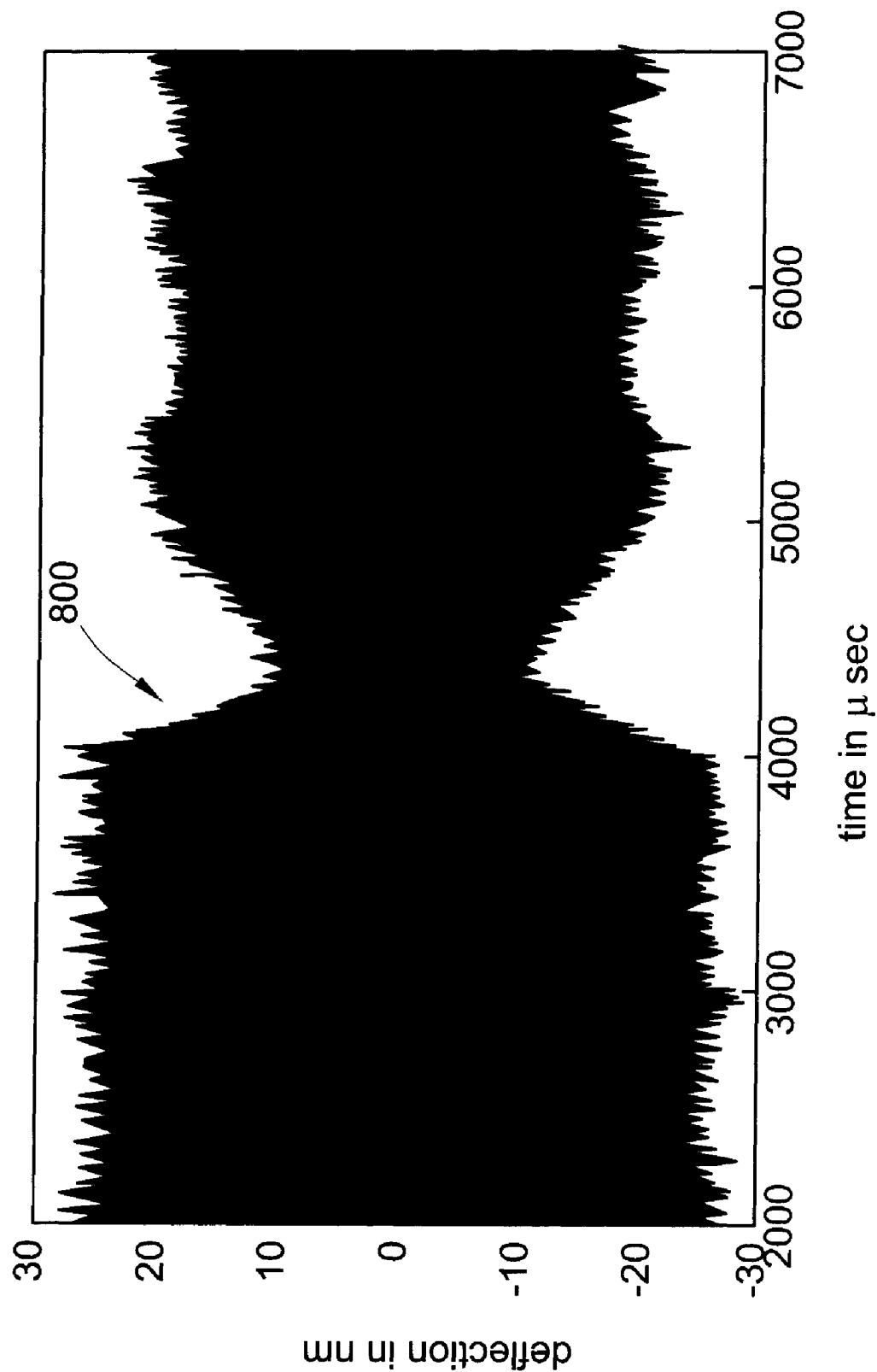
FIG. 8 is a graph of the deflection signal of a cantilever when the cantilever hits a sample.
Figure 9:
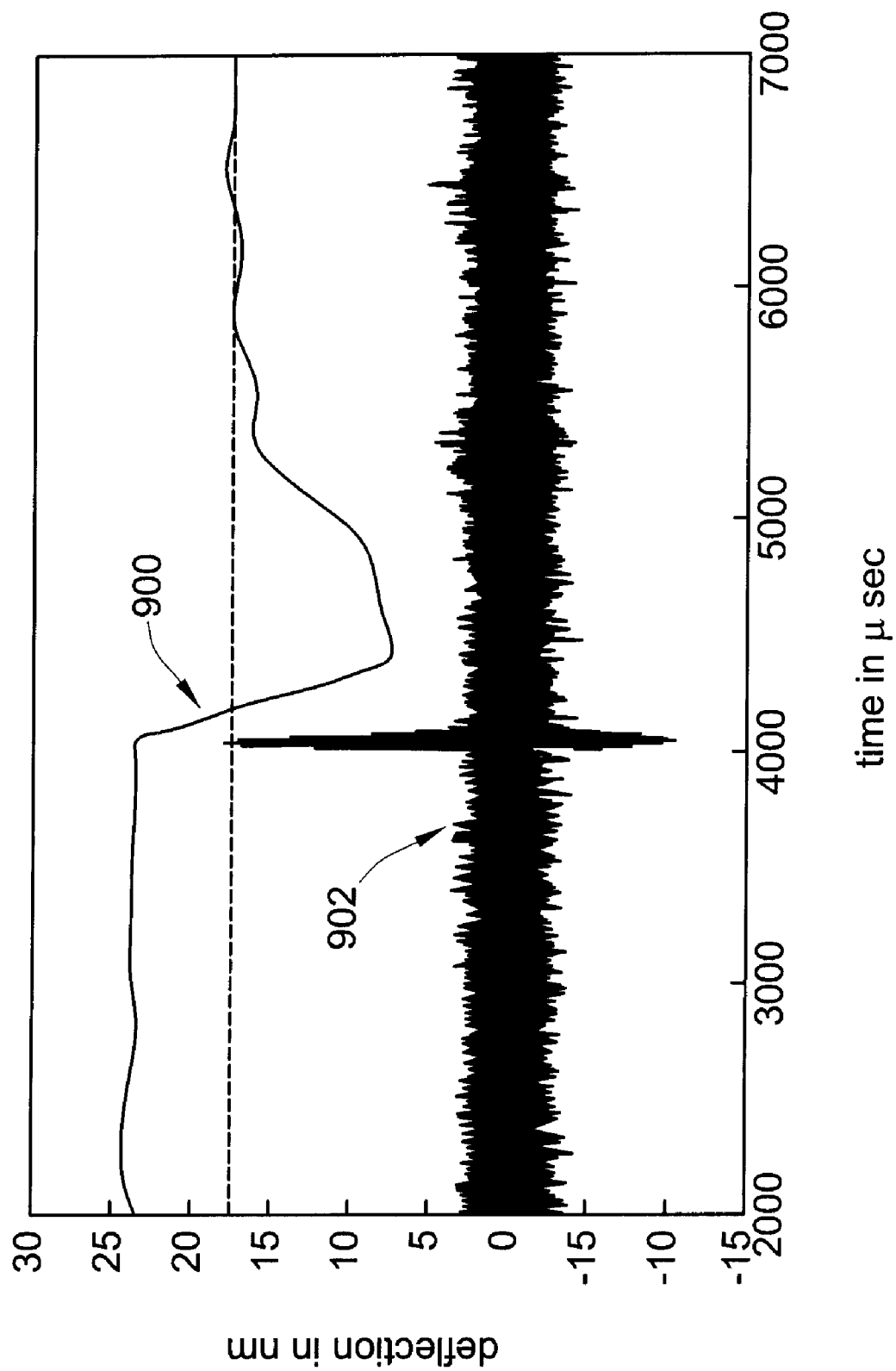
FIG. 9 is a plot of the error in estimation of the observer of FIG. 5 and a demodulated cantilever deflection signal of FIG. 8.

In FIG. 8, the cantilever deflection signal 800 is plotted when cantilever hits the sample of 4 nm height at time instant $\theta$=4000 μsecond. It takes approximately 1200 μseconds for the cantilever to reach the steady state. In FIG. 9, the innovation sequence (curve 900) and the error in estimation (curve 902) are plotted. The dashed line in curve 900 is a 18 nm threshold level for the detection scheme of the invention. There is an error in estimation as soon as the cantilever hits the sample. The change in the deflection is not immediately tracked by the observer 504. However, it can be seen that the observer 504 is fast enough to track the deflection signal during the transient state of the cantilever. It should be noted that in reality, the estimation error approaches a zero mean white noise much before the system stabilizes to a periodic orbit.

Figure 10:
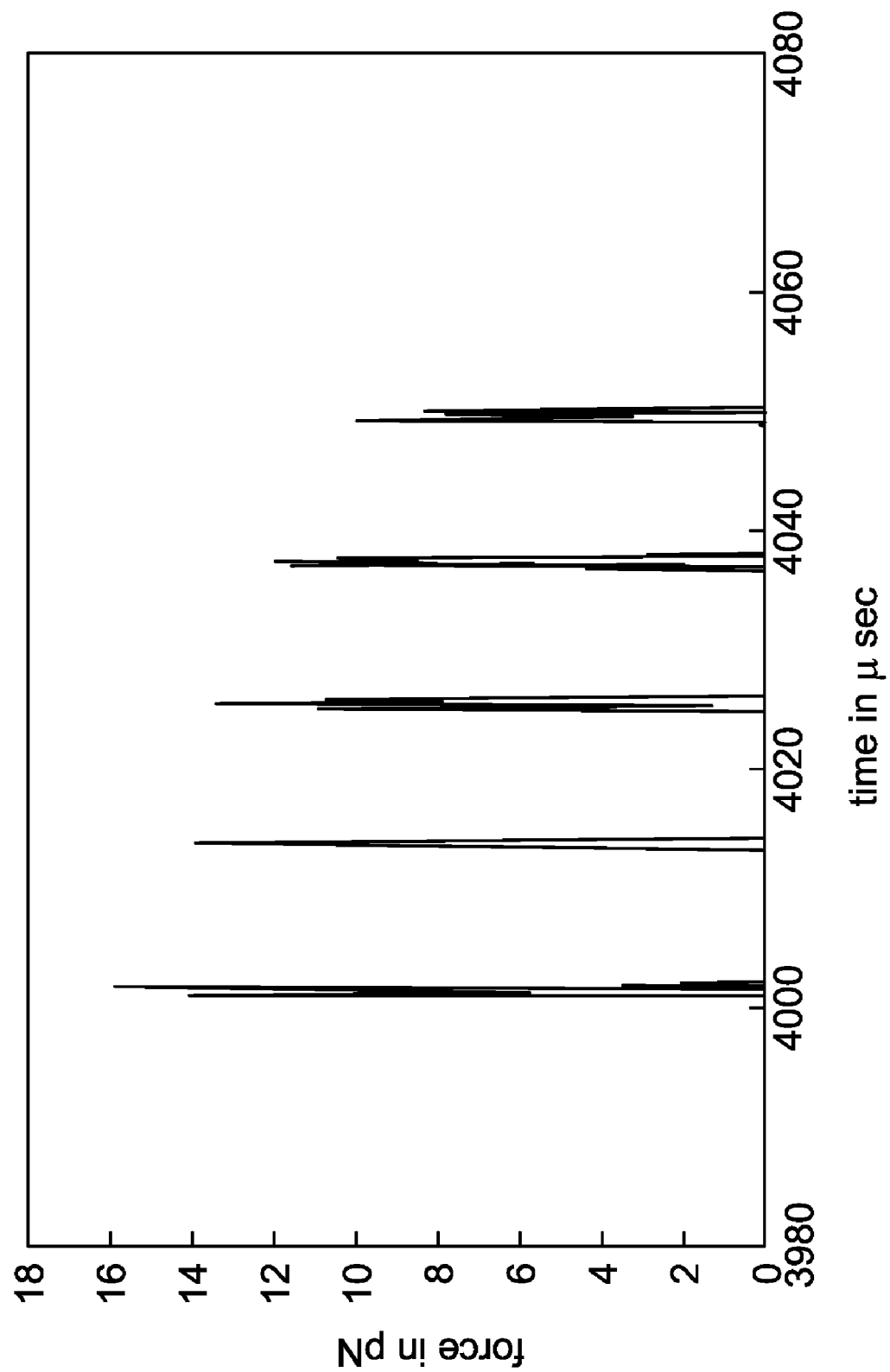
FIG. 10 is a plot showing the tip-sample interaction force of the cantilever of FIG. 1 when the cantilever hits a sample of 4 nm height.

FIG. 10 shows a typical cantilever-sample interaction force 1000 observed when the cantilever encounters a step sample profile of 4 nm high during simulation. This repulsive force is high in magnitude and exists for a smaller time compared to the time-period of oscillation of the cantilever. It is observed that the time spent by the cantilever away from sample is 12 times of what is spent near the sample. Note that for analysis purposes, this force is modeled as an impulsive force (i.e. instantaneous jump in state) as previously described and is not being directly applied during simulation.

Figure 11:
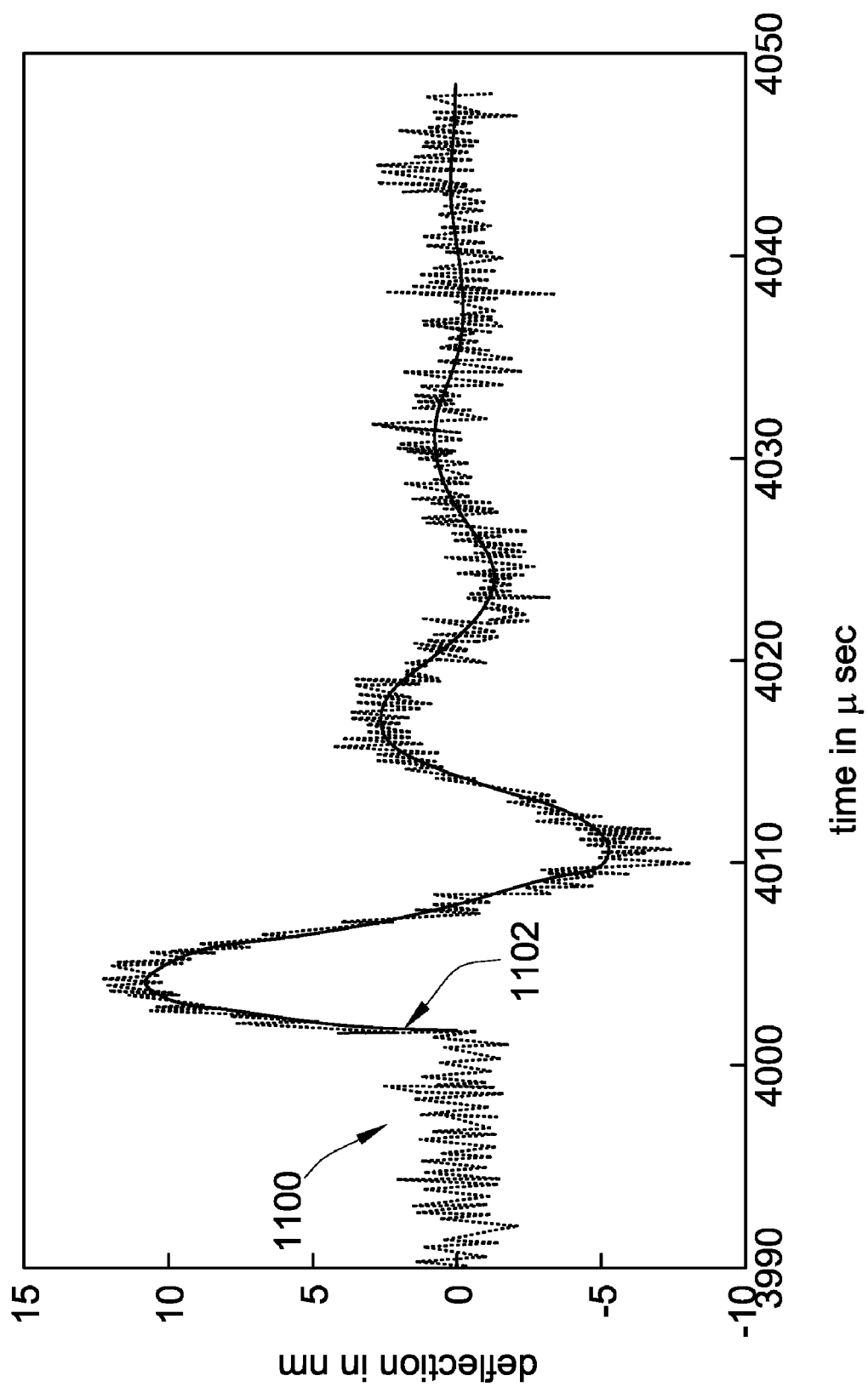
FIG. 11 is a plot showing innovations from the observer of FIG. 5 and an estimated dynamic profile in accordance with the teachings of the present invention.

In FIG. 11, the estimation error (dashed curve 1100) is plotted with the calculated dynamic profile (solid curve 1102) when the arrival time and the magnitude are assumed to be known. It can be seen from FIG. 11 that the residual innovations from the filter 504 can be modeled as a known dynamic profile with an unknown magnitude as implied by equation 8 with additive white Gaussian noise.

Figure 12:
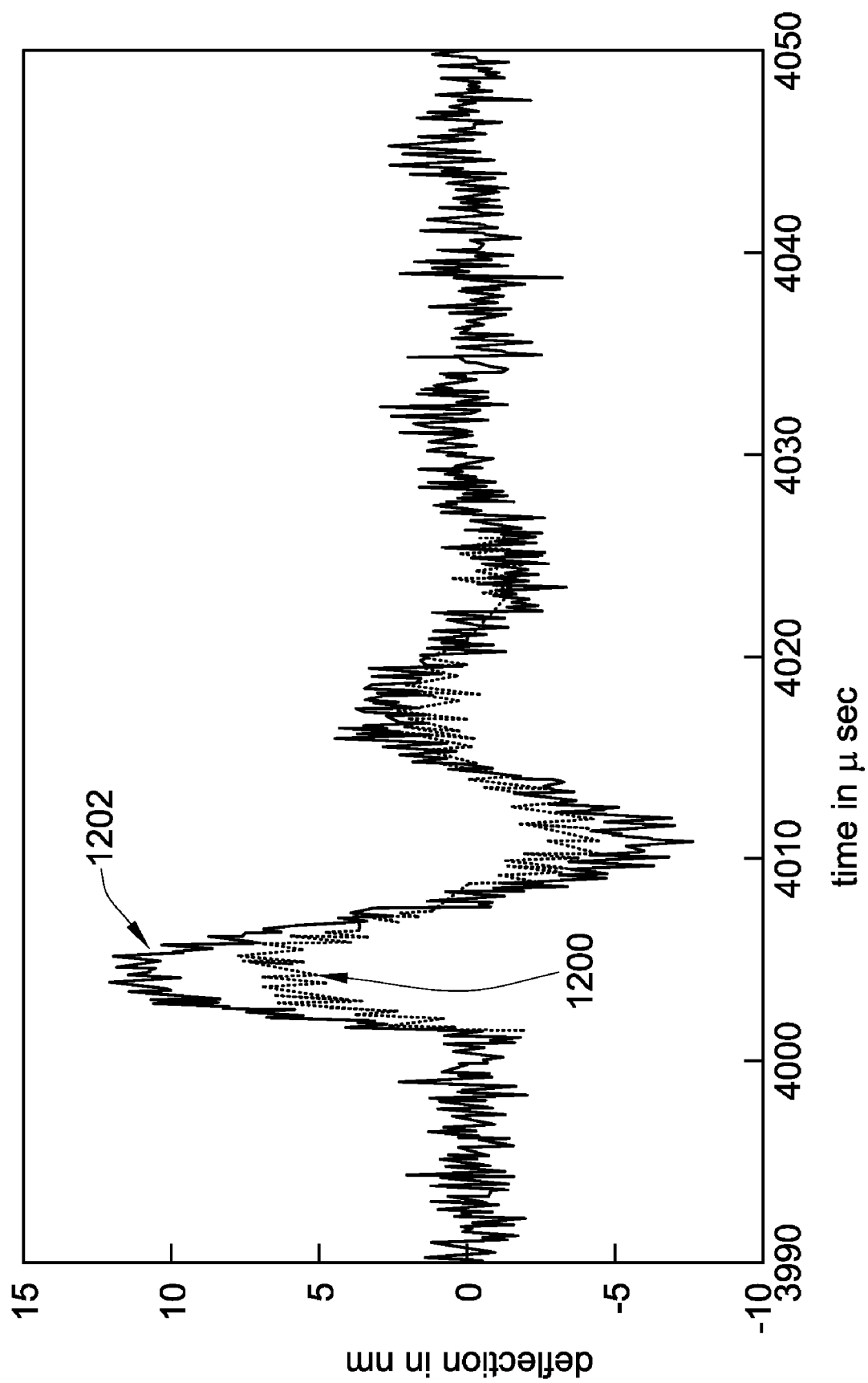
FIG. 12 is a plot showing innovations from the observer of FIG. 5 in accordance with the teachings of the present invention when the cantilever of FIG. 1 has a single hit with a sample of 2 nm and 4 nm height.
Figure 13:
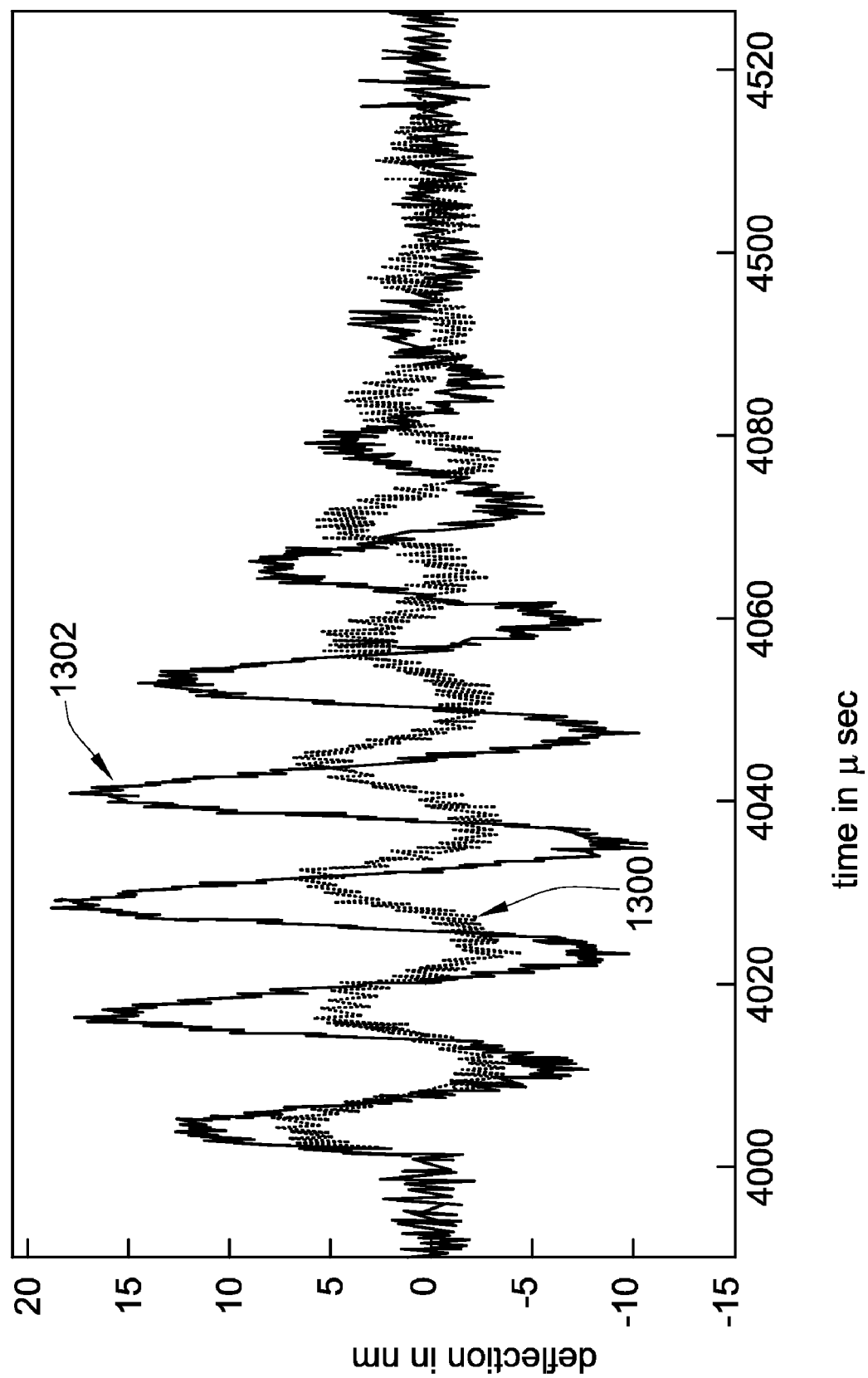
FIG. 13 is a plot showing innovations from the observer of FIG. 5 in accordance with the teachings of the present invention when the cantilever of FIG. 1 has multiple hits with a sample of 2 nm and 4 nm height.

In FIG. 12 the innovation sequence is plotted when the cantilever has a single hit with the sample of heights 2 nm (dashed curve 1200) and 4 nm (solid curve 1202). FIG. 13 plots the innovation sequence when the cantilever has multiple hits with the sample of heights 2 nm (dashed curve 1300) and 4 nm (solid curve 1302). For the single hit case, the dynamic profiles are proportional to each other. However, this is not true for the multiple hits case as the dynamic profiles overlap with each other and the arrival time of them is not uniformly separated in time.

Figure 14:
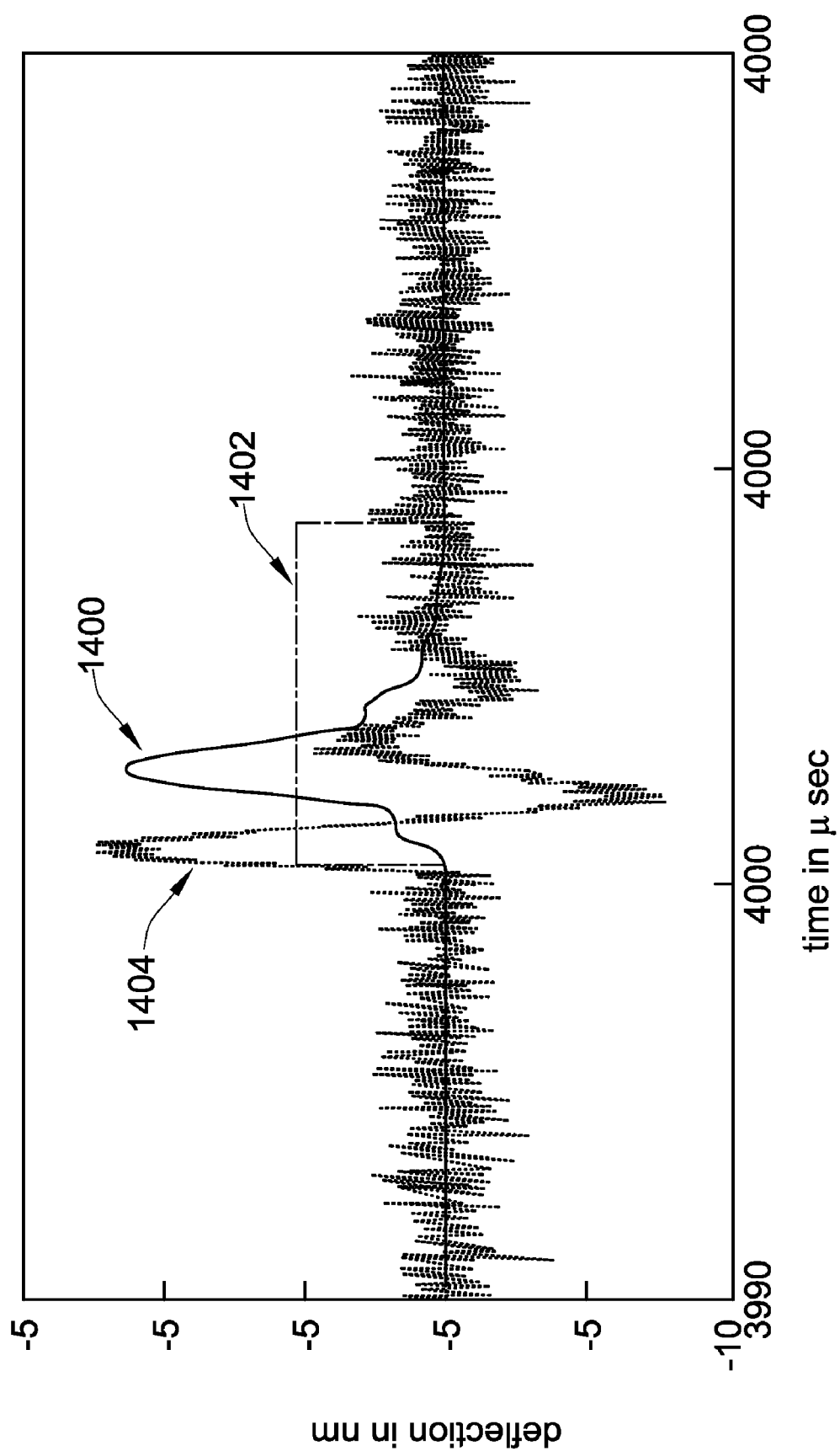
FIG. 14 is a plot showing innovations from the observer of FIG. 5 when the cantilever of FIG. 1 has a single hit with a sample of 4 nm height and a corresnow ponding generalized likelihood ratio and decision rule in accordance with the teachings of the instant invention.
Figure 15:
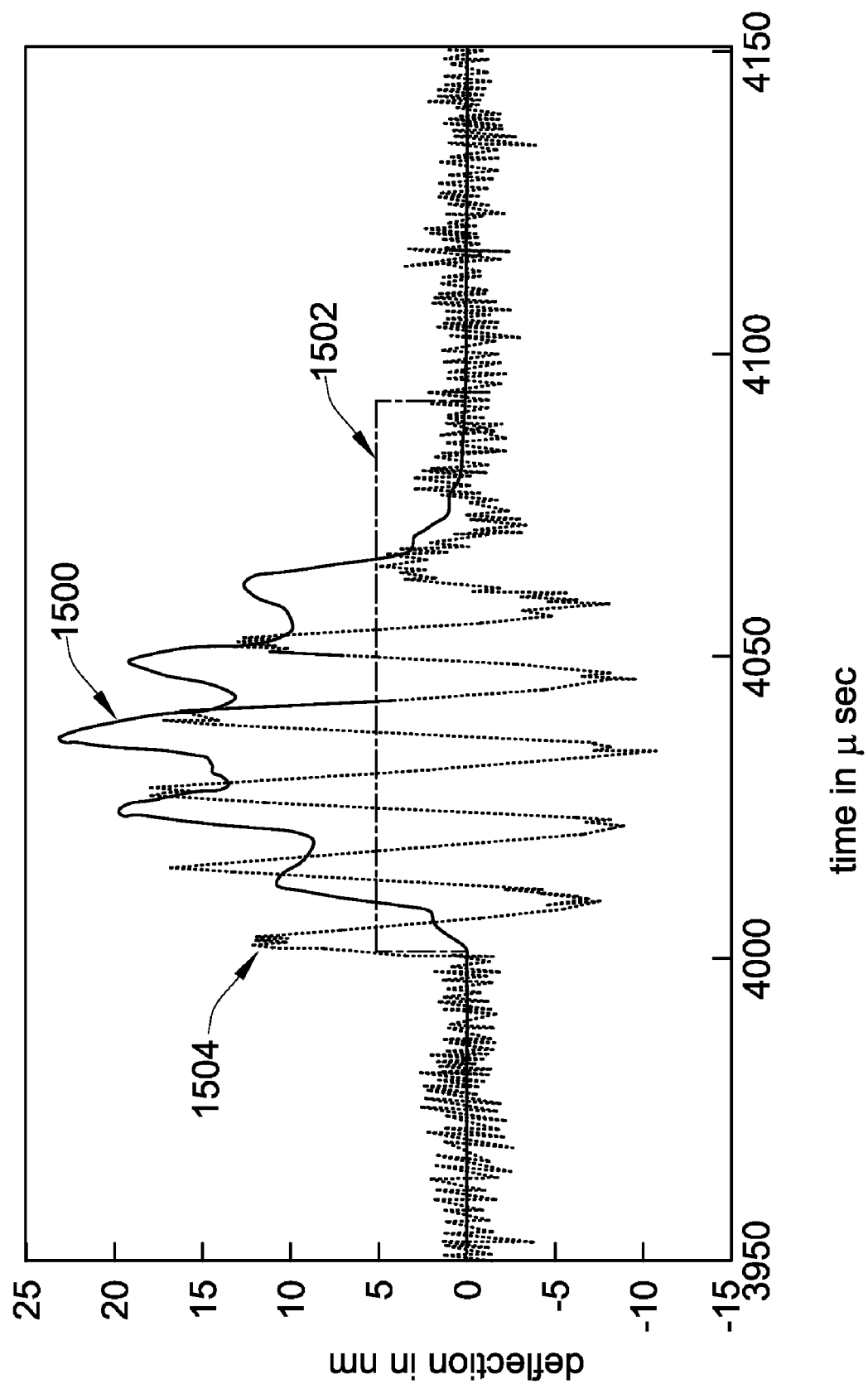
FIG. 15 is a plot showing innovations from the observer of FIG. 5 when the cantilever of FIG. 1 has multiple hits with a sample of 4 nm height and a corresponding generalized likelihood ratio and decision rule in accordance with the teachings of the instant invention.

We derived that when the cantilever hits the sample, the innovation sequence from the filter 504 consists of a dynamic profile of unknown arrival time and magnitude with additive white gaussian noise. Such detection and estimation problem is solved using the generalized likelihood ratio test (GLRT) as described above. Thus for simulation we used GLRT to detect the sample and estimate the size of impact. The unknown arrival time and the unknown magnitude of impact is estimated in maximum likelihood sense. The threshold $\epsilon$ is chosen to keep the false alarm rate below 1%. In FIGS. 14 and 15 the generalized likelihood ratio (solid curves 1400, 1500) and the decision rule (dash-dot curves 1402, 1502) are shown when the cantilever hits a repulsive sample once and multiple times respectively with the innovation sequence (dotted curves 1404, 1504). The generalized likelihood ratio plots are scaled down by a factor of $2*10^{-4}$ times to fit into the graph. The decision rule for detection is scaled by a factor of 5 for the same reason. Note that there is a delay between the occurrence of the jump and its detection. The delay depends upon the threshold value $\epsilon$ and the size of the data window. From simulations, it can be seen that the occurrence is accurately estimated after the delay.

Figure 16:
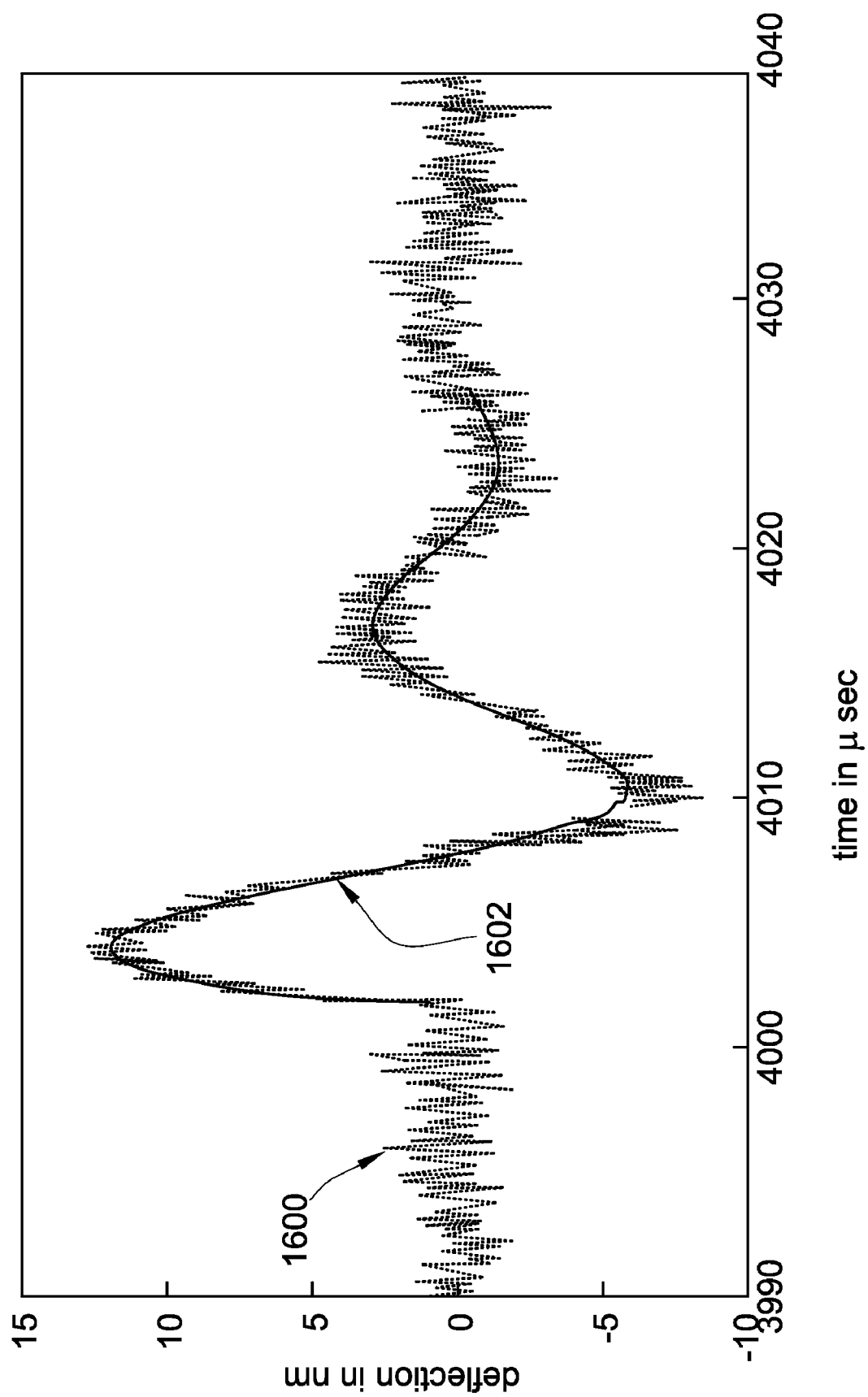
FIG. 16 is a plot showing innovation sequence data from the observer of FIG. 5 and an estimated dynamic profile in accordance with the teachings of the instant invention with a sample of 2 nm height.
Figure 17:
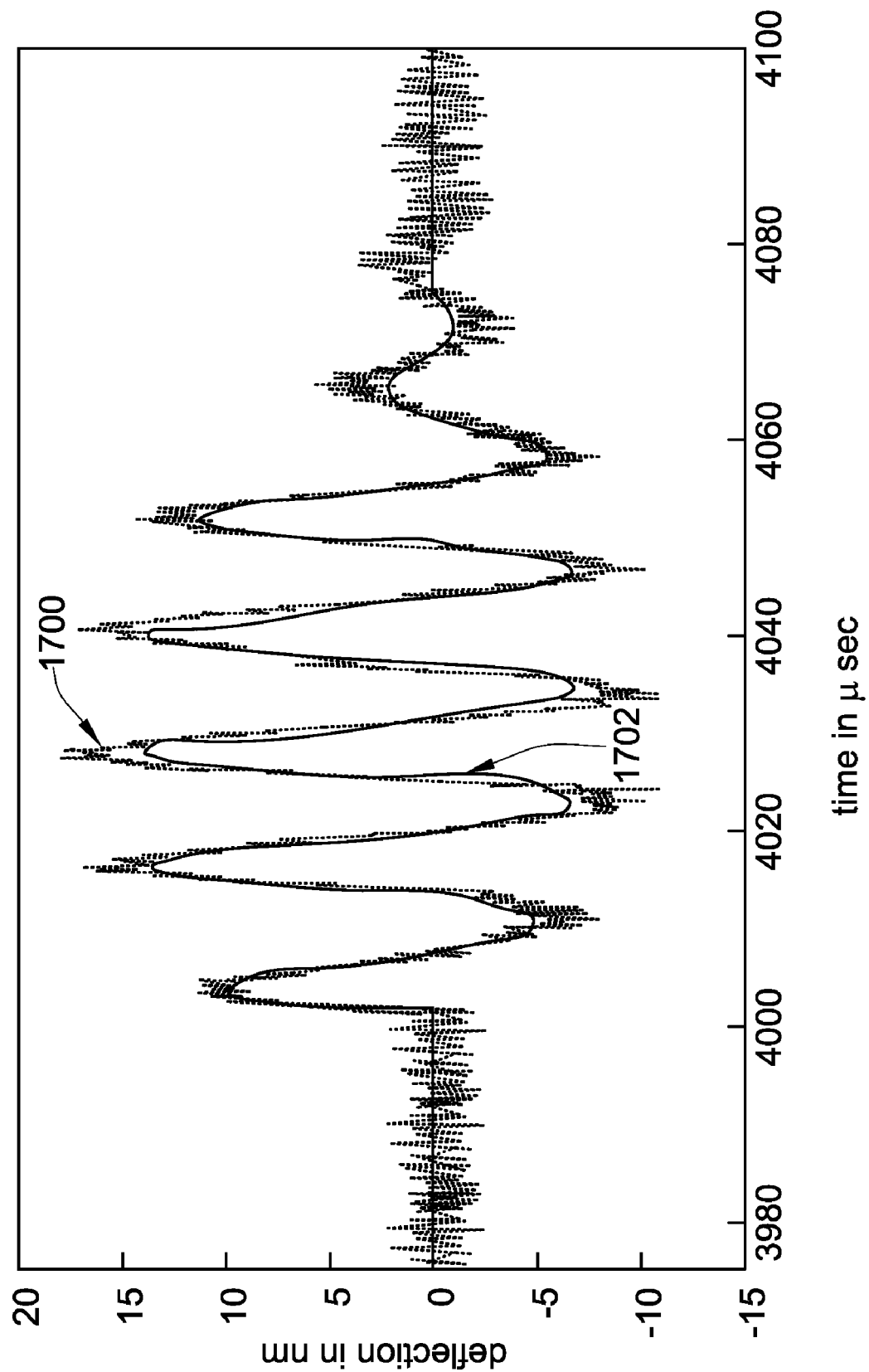
FIG. 17 is a plot showing innovation sequence data from the observer of FIG. 5 and an estimated dynamic profile in accordance with the teachings of the instant invention with a sample of 4 nm height.

In FIGS. 16 and 17, the estimated dynamic profiles (curves 1602, 1702) are plotted against the innovation sequence data (curves 1600, 1700) with a sample of 4 nm height. FIG. 16 shows the single hit case and FIG. 17 shows the multiple hit case. Note that for FIG. 17, adaptive filtering is used to update the innovation sequence after successive detection and estimation. The good match between the two plots suggests the efficient performance of the GLRT algorithm even for the multiple hits case when the successive hits (jumps) are not widely separated in time. Note that for the multiple hit case, one has to be careful in choosing the finite data window size to keep the false alarm and missed alarm rates low.

Conventional detection schemes rely on steady state amplitude and phase data. In the simulation model it takes approximate 1200 μseconds to reach a steady state periodic orbit. In conventional detection schemes that depend on demodulated amplitude profile, a threshold is chosen as 0.8 times the steady state amplitude. The invention takes around 200 μseconds to detect the jump considered for simulation. The transient data exists for 60 μseconds and the decision based on GLRT is made within 20 μseconds. Thus, transient data based detection is at least 10 times faster than the conventional case. For a single hit case, the estimation of jump is therefore 600 times faster compared to steady state estimation.

Experiments were performed to further verify the efficacy of the new transient signal based approach. The slowness of the piezo (the Z component of the X-Y-Z scanner for sample positioning dynamics makes it difficult to generate a waveform of pulses in the order of tens of microseconds. The approach used is to make use of the piezo dynamics to generate a testing waveform. The frequency response of the piezo was obtained using an HP control system analyzer and a model was fit to the response. The model response is compared with that obtained experimentally in FIGS. 18a and b. Curve 1800 is the model magnitude response, curve 1802 is the experimental magnitude response, curve 1804 is the model phase response and curve 1804 is the experimental phase response. It can be seen that the magnitude and phase responses of the model and experimental data substantially overlap.

Figure 19A:
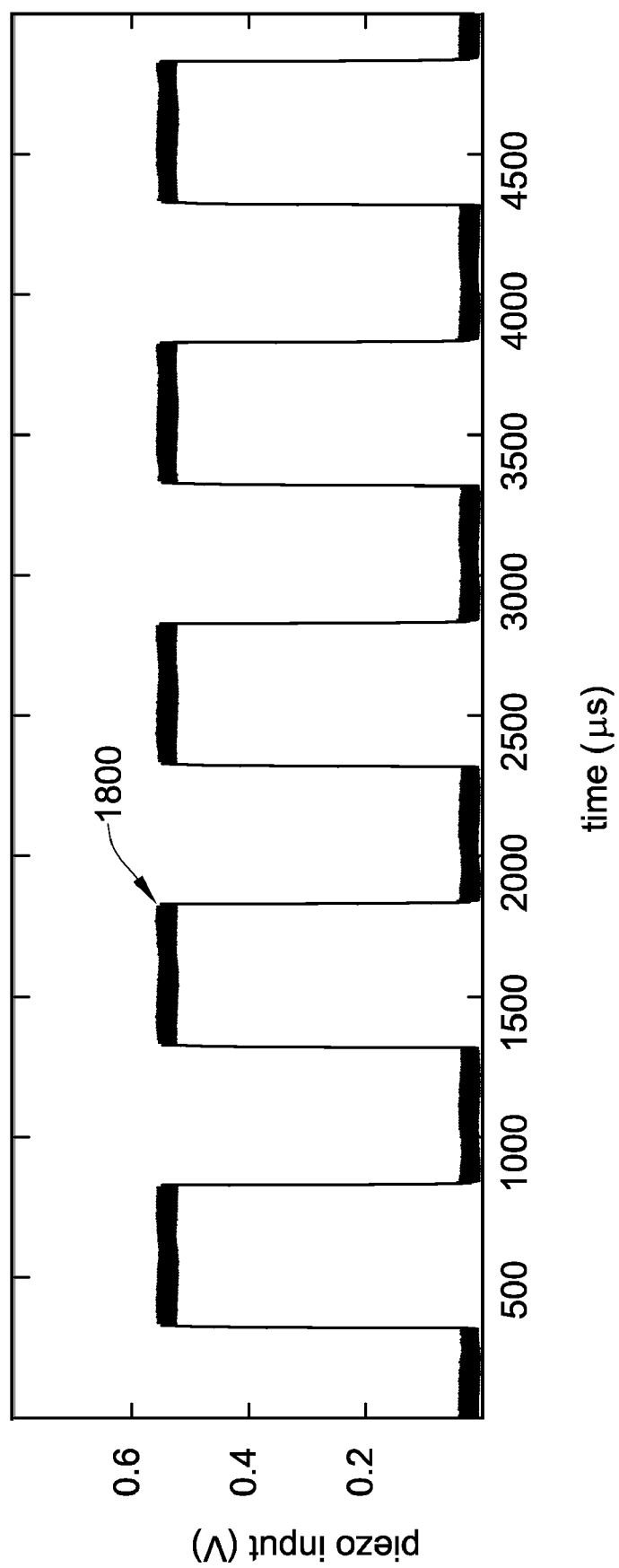
FIGS. 19a and b are graphs illustrating an input voltage and the piezo response to the input voltage.
Figure 19B:
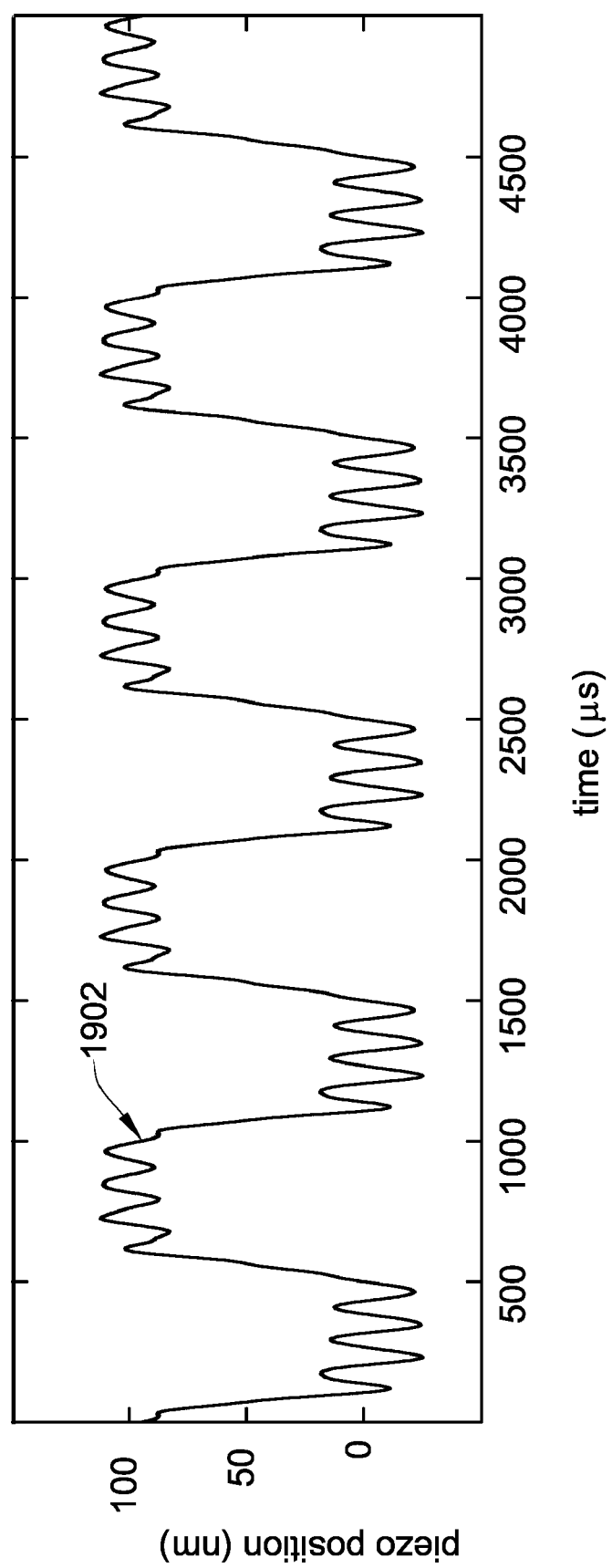
Figure 20B:
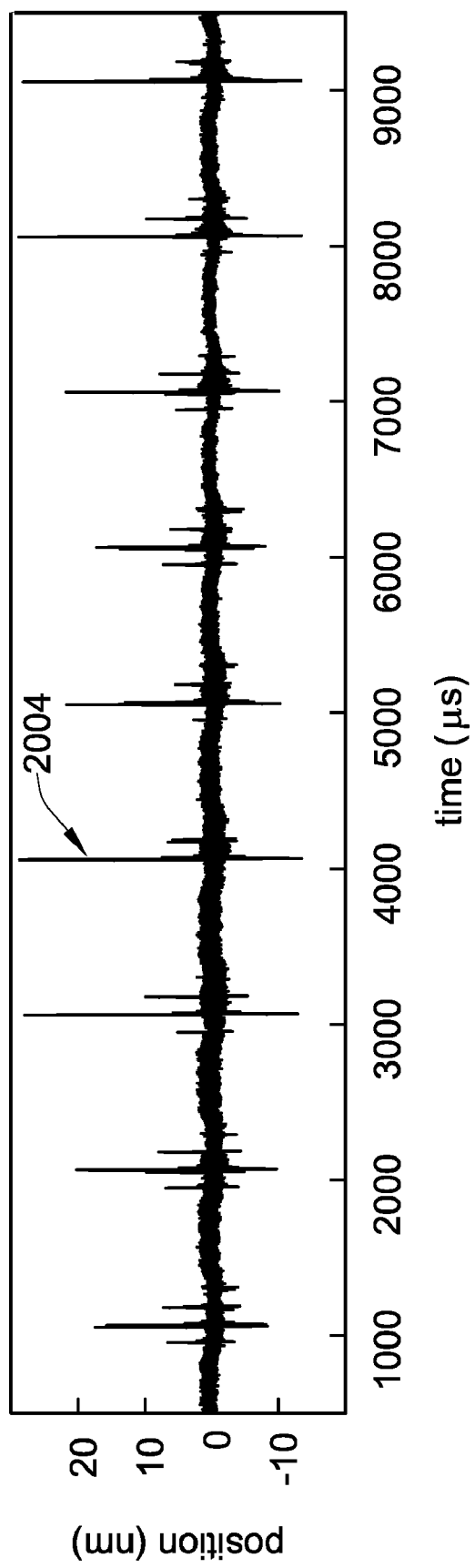
Figure 21A:
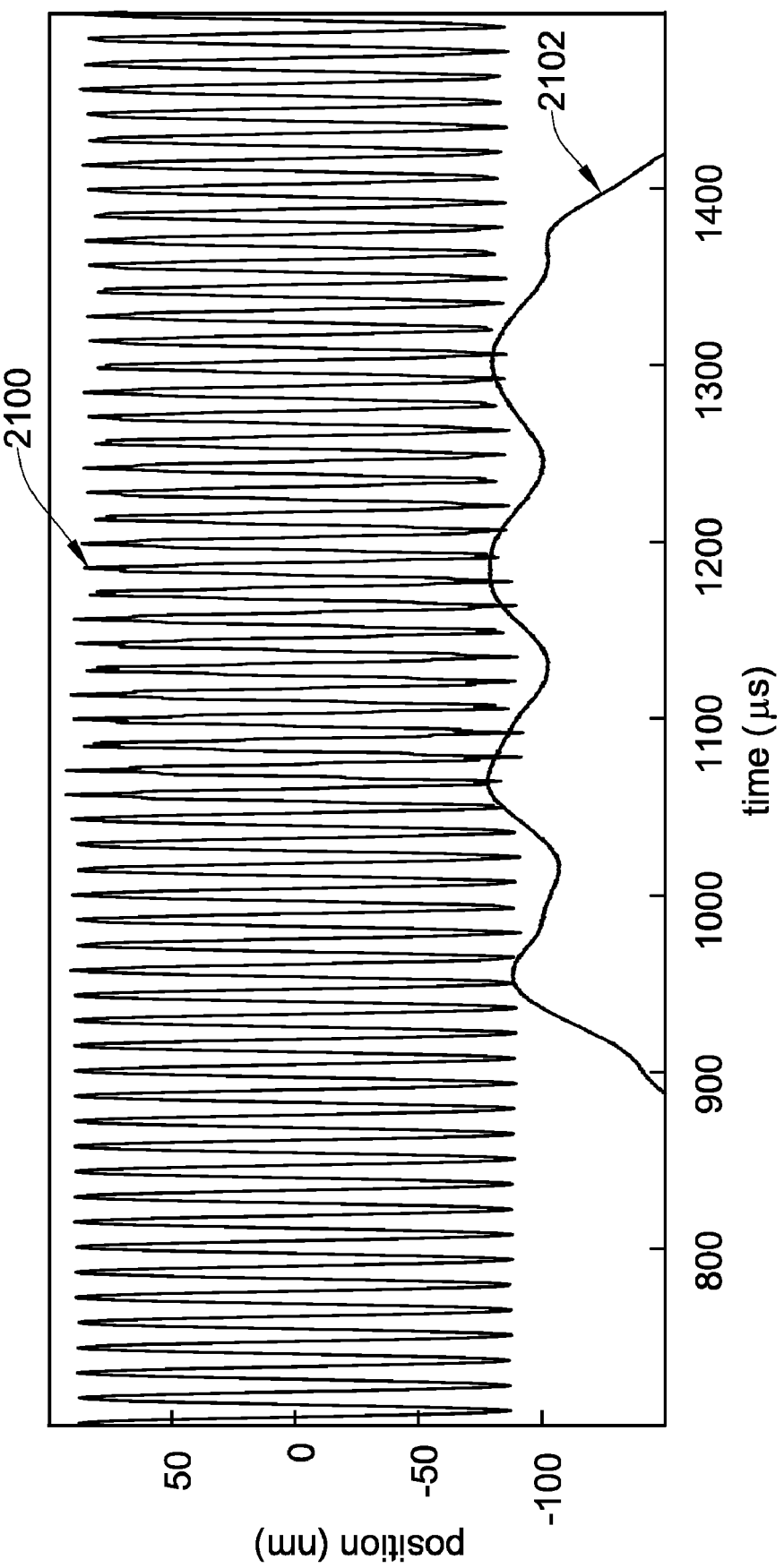
FIGS. 21a and 21b are graphs illustrating the innovation response for a piezo oscillation.
Figure 21B:
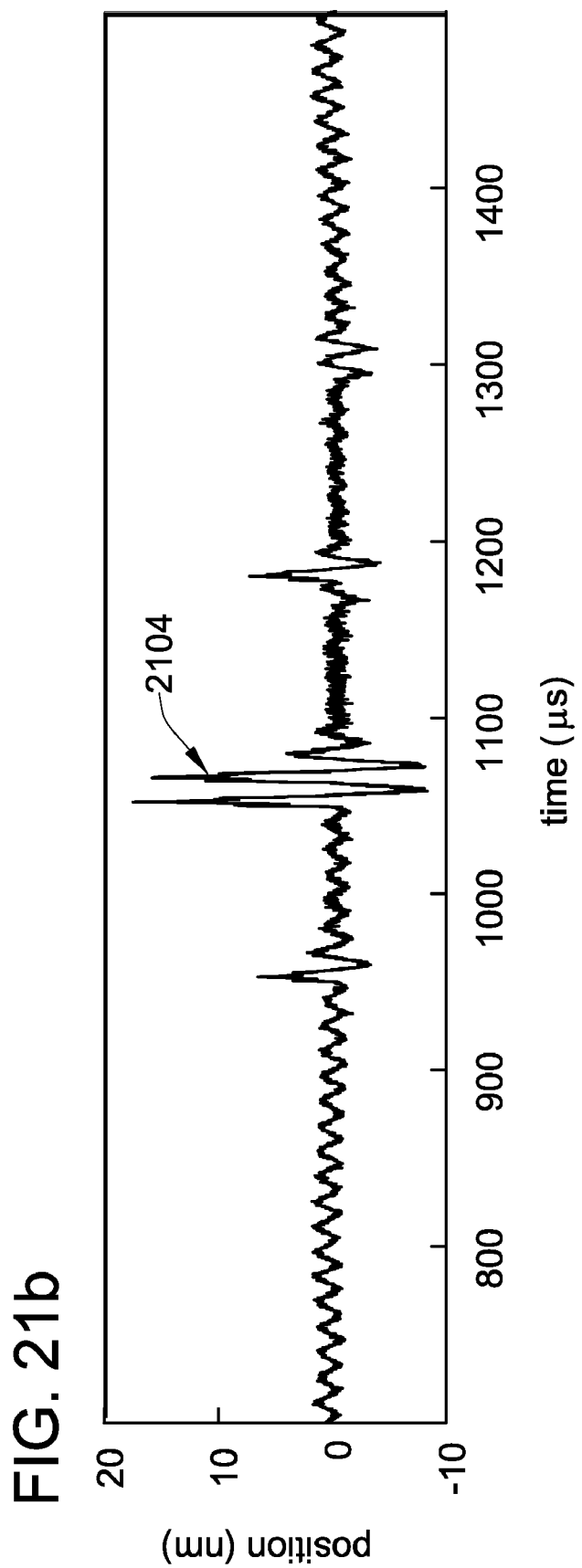
Figure 22A:
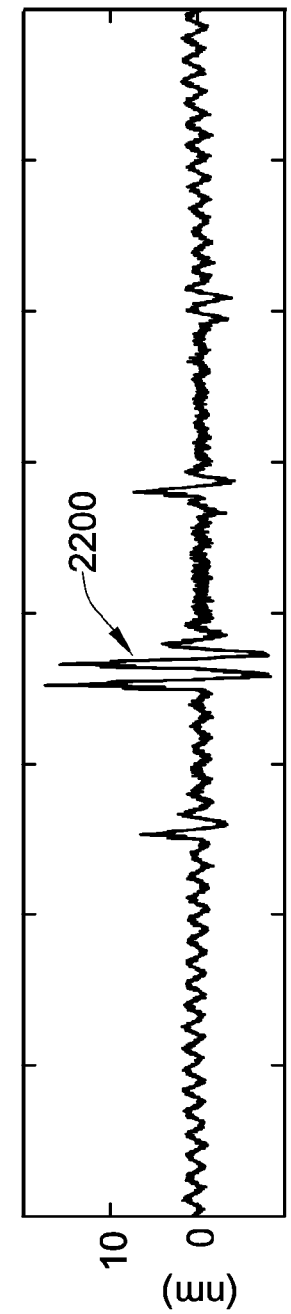
FIGS. 22a-c are graphs illustrating the innovation and likelihood ratio with respect to a piezo movement.
Figure 22B:
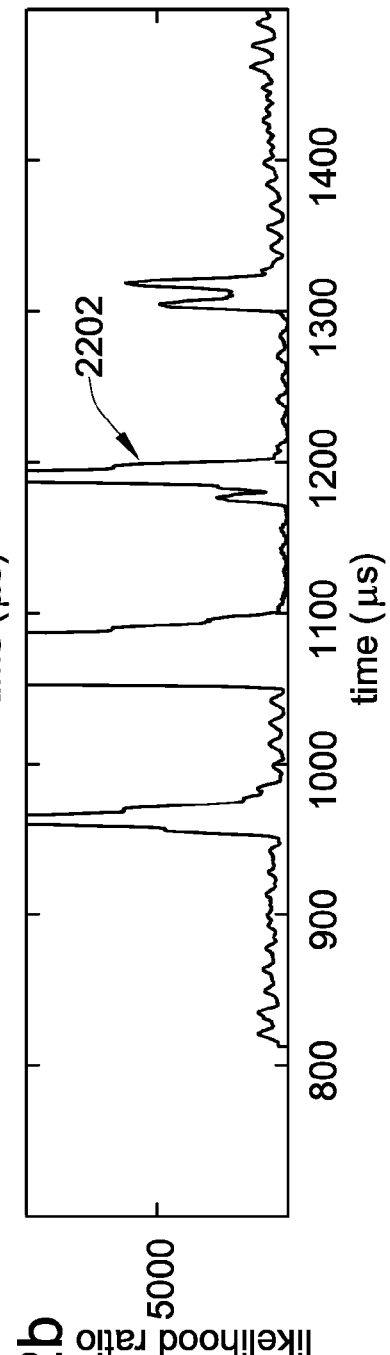
Figure 22C:
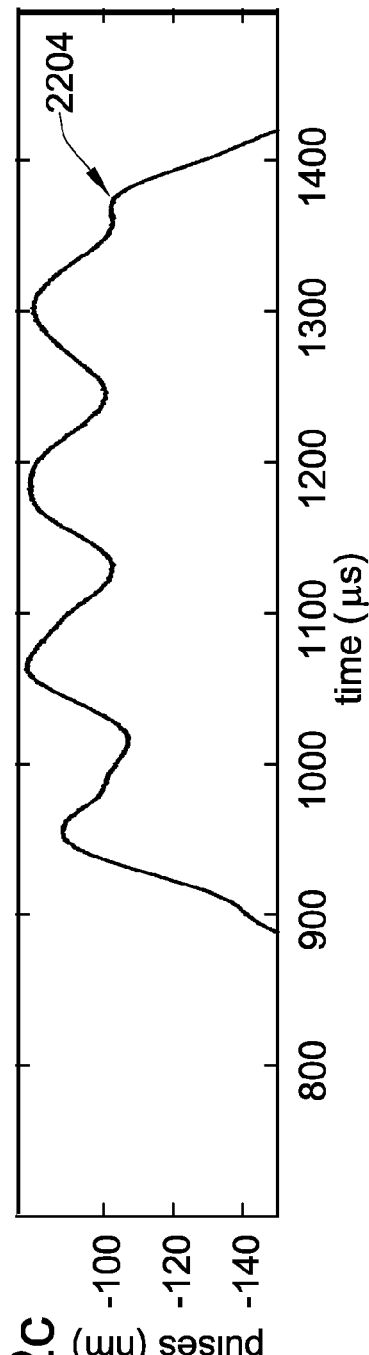

Simulations were performed using the model to obtain the input signals to the piezo. FIG. 19b shows the response of the piezo to a voltage pulse shown in FIG. 19a of amplitude 0.5V, period 1000 μs and on time 500 μs with the four peaks during the on time separated by approximately 100 μs. Curve 1900 is the input voltage pulse and curve 1902 is the piezo response. The piezo dynamics results in the occurance of 4 peaks separated by approximately 100 μs during the on time. The maximum width of each peak is approximately 35 μs. The cantilever is oscillated at the first resonant frequency of 70.1 kHz. The amplitude of oscillation was approximately 80 nm and the oscillating tip was approximately 100 nm away from the sample surface. The piezo is actuated with the voltage pulse mentioned above. The oscillating cantilever interacts with the resulting peaks. The objective is to detect these peaks using the transient signal scheme. A two mode model was obtained for the cantilever with the first resonance at 70.1 kHz and the second resonance at 445 kHz. This model is used to build the filter and obtain the innovation sequence. The resulting innovation sequence is shown in FIGS. 20a, 20b and 21a, 21b. In FIGS. 20a and 20b, the cantilever deflection signal is plotted against the pulse shape generated using the piezo dynamics. Curve 2000 is the cantilever deflection, curve 2002 is the piezo position, and curve 2004 is the innovations. It is difficult to detect when the cantilever tip interacts with the peaks looking at the deflection signal 2000. The innovation process, on the other hand, bears the signature of the hits. Every time the cantilever interacts with the sample, the innovation curve loses the zero mean white nature as can be seen. In other words, the innovations become non-white when there is a hit and a dynamic profile appears. This dynamic profile is detected using the techniques described above. In FIG. 21a and b, curve 2100 is the cantilever deflection, curve 2102 is the piezo position, and curve 2104 is the innovation sequences It can be seen that the innovations show signatures of all four peaks and that the dynamic profile is clearly seen when the hits occur. The resulting likelihood ratio is shown in FIGS. 22a-c. In FIGS. 22a-c, curve 2200 is the innovation sequence, curve 2202 is the likelihood ratio, and curve 2204 is the piezo movement. Using the likelihood ratio it is possible to accurately detect the hits as predicted by the simulations proving the efficacy of the transient signal based detection scheme.

The GLRT is a computationally expensive algorithm. A simplified version of GLRT can be used where maximization over θ is replaced with $\hat{\theta}=n-M+1$. Another simplification is SLGR where maximization over ν is replaced with a prior fixed $\hat{v}$. These simplified algorithms require a wise selection of data window size M and prior fixed $\hat{v}$.

From the foregoing, it can be seen that a new approach to determine cantilever movement has been described. An observer based state estimation and statistical signal detection and estimation techniques have been applied. A first mode approximation model of the cantilever is considered and an observer is designed to estimate the dynamic states. The cantilever-sample interaction is modeled as an impulsive force applied to the cantilever in order to detect the presence of sample. Generalized likelihood ratio test is performed to obtain the decision rule and the maximum likelihood estimation of the unknown arrival time of the sample profile and unknown magnitude of it. Simulations on a realistic model indicate significant gains in the speed of detection using these techniques.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method to detect transient movement of a cantilever in a sensing system, the method comprising the steps of:
   receiving a cantilever input signal and deflection data corresponding to the cantilever input signal;
   generating an estimated dynamic state of the cantilever movement using the cantilever input signal and deflection data, the estimated dynamic state having a dynamic profile of unknown arrival time and unknown magnitude with additive white Gaussian noise; and
   computing maximum likelihood estimates of the arrival time and magnitude using a generalized likelihood ratio test.

2. The method of claim 1 wherein the step of computing maximum likelihood estimates includes the step of selecting a threshold $\epsilon$ such that a false alarm rate is below one percent.

3. The method of claim 1 further comprising the step of updating the estimated dynamic state with the maximum likelihood estimates of the arrival time and the magnitude.

4. The method of claim 1 wherein the dynamic profile is defined by the equation $$Y_{i;\theta} = H[\Phi(i,\theta) - FX(i-1;\theta)]$$

$$X(i;\theta) = K_i Y_{i;\theta} + FX(i-1;\theta)$$

where and where $\Phi(i,\theta) = \Pi^i_{j=\theta} F$, $X(i;i) = K_i H$, $K_i$ is a filter gain, F is a function of the first resonance frequency of the cantilever and the damping factor in free medium, $\theta$ is an arrival time, and H is a function of cantilever position and cantilever velocity.

5. The method of claim 4 wherein step of generating an estimated dynamic state includes the step of generating a maximum likelihood estimate of arrival time, the maximum likelihood estimate of arrival time being given by a value $\theta \leq n$ such that $\hat{\theta}_n = \arg\max_{1 \leq \theta \leq n} l(n;\theta)$ where $l(n;\theta) = d^T(i;\theta) C^{-1}(n;\theta) d(n;\theta)$, $$C(n;\theta) = \sum_{i=\theta}^{n} Y_{i;\theta}^T V^{-1} Y_{i;\theta}, \, d(n;\theta) = \sum_{i=\theta}^{n} Y_{i;\theta}^T V^{-1} Y_i, \, V = HPH^T + R,$$

H is a function of cantilever position and cantilever velocity, P is a state estimation error covariance matrix and R is measurement noise power.

6. The method of claim 5 wherein the step of generating the maximum likelihood estimate of arrival time includes the step of generating the maximum likelihood estimate of arrival time in a data window of finite length.

7. The method of claim 4 wherein the maximum likelihood estimate of magnitude is given by a value $\hat{v}_n(\theta) = C^{-1}(n;\theta) d(n;\theta)$ where $$C(n;\theta) = \sum_{i=\theta}^{n} Y_{i;\theta}^T V^{-1} Y_{i;\theta}, \, d(n;\theta) = \sum_{i=\theta}^{n} Y_{i;\theta}^T V^{-1} Y_i, \, V = HPH^T + R,$$

H is a function of cantilever position and cantilever velocity, P is a state estimation error covariance matrix and R is measurement noise power.

8. The method of claim 7 wherein the step of generating the maximum likelihood estimate of magnitude includes the step of generating the maximum likelihood estimate of magnitude in a data window of finite length.

9. A method of estimating the transient deflection of a cantilever operating in dynamic mode in a sensing system, the method comprising the steps of:
   receiving, by an observer, a cantilever input signal and cantilever deflection data corresponding to the cantilever input signal;
   generating, by the observer, an estimated dynamic state of the cantilever movement using the cantilever input signal and cantilever deflection data, the estimated dynamic state having a dynamic profile of unknown arrival time and unknown magnitude;
   computing, by the observer, maximum likelihood estimates of the arrival time and magnitude using a generalized likelihood ratio test; and
   estimating the transient deflection of the cantilever using the maximum likelihood estimates of the arrival time and the magnitude.

10. The method of claim 9 wherein the step of generating an estimated dynamic state includes the step of generating a measurement residual, the measurement residual equal to the dynamic profile plus an offset, the offset being a non-jump measurement residual.

11. The method of claim 10 wherein the non-jump measurement residual comprises white Gaussian noise.

12. The method of claim 9 wherein the dynamic profile is defined by the equation $$Y_{i;\theta} = H[\Phi(i,\theta) - FX(i-1;\theta)]$$

$$X(i;\theta) = K_i Y_{i;\theta} + FX(i-1;\theta)$$

where and where $\Phi(i,\theta) = \Pi^i_{j=\theta} F$, $X(i;i) = K_i H$, $K_i$ is a filter gain, F is a function of the resonance frequency of the cantilever and the damping factor in free medium, $\theta$ is an arrival time, and H is a function of cantilever position and cantilever velocity.

13. The method of claim 12 wherein the maximum likelihood estimate of arrival time is given by a value $\theta \leq n$ such that $\hat{\theta}_n = \arg\max_{1 \leq \theta \leq n} l(n;\theta)$ where $$l(n;\theta) = d^T(i;\theta) C^{-1}(n;\theta) d(n;\theta), \, C(n;\theta) = \sum_{i=\theta}^{n} Y_{i;\theta}^T V^{-1} Y_{i;\theta},$$

$$d(n;\theta) = \sum_{i=\theta}^{n} Y_{i;\theta}^T V^{-1} Y_i, \, V = HPH^T + R,$$

H is a function of cantilever position and cantilever velocity, P is a state estimation error covariance matrix and R is measurement noise power.

14. The method of claim 12 wherein the maximum likelihood estimate of arrival time is given by a value $\hat{v}_n(\theta) = C^{-1}(n;\theta)d(n;\theta)$ where $$C(n;\theta) = \sum_{i=\theta}^{n} Y_{i;\theta}^T V^{-1} Y_{i;\theta},$$

$$d(n;\theta) = \sum_{i=\theta}^{n} Y_{i;\theta}^T V^{-1} Y_i, \ V = HPH^T + R,$$

H is a function of cantilever position and cantilever velocity, P is a state estimation error covariance matrix and R is measurement noise power.

15. A control system adapted to perform the method of claim 9 comprising:
 a first mode approximation model of the cantilever;
 a cantilever-sample interaction model in communication with the first mode approximation model; and
 an observer designed to estimate the dynamic state of the cantilever movement, the observer in communication with the first mode approximation model of the cantilever.

16. The control system of claim 15 wherein the cantilever-sample interaction model is modeled as an impulsive force applied to the cantilever.

17. The control system of claim 16 wherein the impulsive force comprises a repulsive part of the cantilever-sample interaction.

18. The control system of claim 15 wherein the first mode approximation model of the cantilever and the observer are adapted to receive an input signal of the cantilever.

19. The control system of claim 15 wherein the observer is adapted to:
 receive a cantilever input signal and deflection data corresponding to the cantilever input signal;
 generate an estimated dynamic state of the cantilever movement using the cantilever input signal and deflection data, the estimated dynamic state having a dynamic profile of unknown arrival time and unknown magnitude;
 compute maximum likelihood estimates of the arrival time and magnitude using a generalized likelihood ratio test; and
 estimate a transient deflection of the cantilever using the maximum likelihood estimates of the arrival time and the magnitude.

* * * * *